United States Patent [19]

Haug et al.

[11] Patent Number: 5,779,911
[45] Date of Patent: Jul. 14, 1998

[54] AQUEOUS FLUID PURIFICATION MONITORING AND CONTROL SYSTEM AND PROCESS

[76] Inventors: Irving M. Haug, 910 Island Dr., No. 112, Rancho Mirage, Calif. 92270; David F. Hilbiber, 357 Tennessee Rd., Winlock, Wash. 98072

[21] Appl. No.: 630,609

[22] Filed: Apr. 10, 1996

[51] Int. Cl.$^6$ .................... B01D 17/12; B01D 37/00
[52] U.S. Cl. .................. 210/739; 210/85; 210/87; 210/96.1; 210/746; 210/143; 364/502
[58] Field of Search ................. 210/85, 87, 90, 210/96.1, 96.2, 138, 143, 257.2, 735, 741, 742, 746, 97; 324/439, 441; 364/497, 500, 502, 496; 55/270, 274

[56] References Cited

U.S. PATENT DOCUMENTS

| | | | |
|---|---|---|---|
| 3,838,774 | 10/1974 | Dolan et al. | 210/85 |
| 4,587,518 | 5/1986 | King | 324/441 |
| 4,801,375 | 1/1989 | Padilla | 210/257.2 |
| 4,885,081 | 12/1989 | Oliver | 210/87 |
| 4,937,557 | 6/1990 | Tucci et al. | 340/603 |
| 5,096,574 | 3/1992 | Birdsong et al. | 210/96.2 |
| 5,103,179 | 4/1992 | Thomas et al. | 324/439 |
| 5,450,358 | 9/1995 | Seibert et al. | 364/502 |
| 5,499,197 | 3/1996 | Foll | 210/143 |
| 5,644,501 | 7/1997 | Lin et al. | 364/496 |
| 5,646,863 | 7/1997 | Morton | 210/85 |

OTHER PUBLICATIONS

Ultrafiltration—for the Water Quality Improvement Industry, by Irving M. Haug Copyright 1991.

Primary Examiner—Joseph W. Drodge
Attorney, Agent, or Firm—Delbert J. Barnard

[57] ABSTRACT

A water purification system (100) for monitoring and controlling the efficacy and efficiency of a filter (134). Monitored transducer element signals are conditioned and collected with electronic circuitry into a digital computer (195). The system continuously supervises alarms and system status conditions. The system creates process variables by normalizing conductivity and flow signals relative to measured temperature signals, calculating zero offset values for various signals, and determining the gain factor values for all signals. The process variables are used to normalize the efficacy and efficiency of the system. The signals are normalized relative to temperature by a software program in the digital computer and stored therein. Alarm conditions can be automatically controlled by either discrete logic components or by the software program for the digital computer (195).

23 Claims, 10 Drawing Sheets

AQUEOUS FLUID PURIFICATION MONITORING AND CONTROL SYSTEM AND PROCESS

TECHNICAL FIELD

This invention relates generally to fluid purification systems, and more particularly, to purification systems that monitor characteristics of an aqueous fluid both before and after filtration, with data from instrumentation transducers such as conductivity, temperature, flow, and pressure transducers.

BACKGROUND OF THE INVENTION

In aqueous fluid purification systems, multiple filters are used to remove increasingly smaller contaminants. The smallest contaminants removed typically are dissolved ionic contaminants, such as salts or metals. Multiple filter systems are used, for example, by pharmaceutical companies in drug production, by electronics manufacturers for chip manufacturing, by hospitals to filter contaminants from fluids given to patients, and municipalities for potable water systems. Due to a variety of recent technological advancements in these industries, demand is increasing for more accurate, robust, and inexpensive systems to monitor and control aqueous fluid purification processes.

Common types of filters used to purify aqueous fluids are reverse osmosis (RO) membranes, ultrafiltration membranes, and porous media filters, such as activated carbon or ion exchange. The word "filter" used herein includes any solution device that changes a fluid's content of dissolved solids, colloids, or organic material. Such solution devices can also be termed molecular screens.

A reverse osmosis (RO) filter is an example of a high pressure vessel filter. In an RO system, an aqueous fluid is pumped into a high pressure chamber that contains a cast membrane. Impure fluid in the inlet region of the chamber passes across the membrane. High pressure forces fluid from the impure solution through the membrane by an absorption-desorption process. This fluid is referred to as the "product," and is the purified fluid that is used in a particular application. Fluid that does not pass through the membrane exits the high pressure chamber through an outlet port. This fluid is referred to as "waste." The waste carries with it the ionic solids separated by the membrane.

However, some of the ionic solids and other water borne contaminants collect over time on the inlet side of the membrane. This accumulation of solids decreases laminar flow across the membrane, which lowers the filtering capacity of the RO membrane. Because it is difficult to predict the rate at which contaminants build up, RO filter systems historically have been characterized as limited in use.

Not only does contaminate build up affect the efficacy and efficiency of an RO system, but a substantial decrease in membrane performance can cause permanent damage to the membrane itself. For example, an inadequately maintained membrane may slowly deteriorate until holes develop, requiring complete replacement of the filter.

Since the cost of solid cast membranes are relatively expensive, RO systems have adapted various ways to monitor the filter membrane. One approach used to estimate contaminate build up across the membrane is to monitor the amount of time the membrane has been in use. After a predetermined period, the membrane is replaced. Generally, this approach is not a good indicator of the condition of the membrane because the membrane's condition can change abruptly. Such a change can occur when, for example, a municipality changes wells or incorporates a new additive into the potable water supply, or a semiconductor plant develops new layering processes which introduce new ionic compounds into their waste water.

Another approach to ensure the integrity of the membrane is to monitor the conductivity of both the supply fluid and the product fluid. The ratio of the two allows calculation of the percent rejection of impurities and hence, the efficiency of the system. Conventionally, RO systems use percent rejection differences resulting from conductivity signals collected by applying a pair of transducer elements disposed across the membrane. These transducer elements "sense" conductivity and "report" in the electrical recognition form of a square wave impulse signal. Electrical impulse signals are developed by two precisely spaced wires potted into a receptacle that is placed in the fluid stream. This approach has the advantage of circuit simplicity, however, it is difficult to maintain the squareness of the waveform due to capacitance in the conductivity element and associated circuitry, and consequently, accuracy is lost. The capacitive effects degrade the rise and fall times of the square waveform and the conductivity signal amplification circuit is loaded in such a way that ringing can occur. The degraded waveform creates an uncertainty in the measurement of the signals, which lessens the ability of the circuit to accurately identify the quantity of ionic solids removed by the RO filter. While this approach has gained a lot of expectancy in the field of monitoring RO systems, its accuracy is limited.

U.S. Pat. No. 3,838,774 of Dolan et al. describes a water monitoring system for water in which a pair of conductivity elements are disposed on opposite sides of a membrane. A signal generator supplies a square electrical waveform input to the conductivity elements whereby the difference between the two output values are compared to determine the water impurity level and if an alarm should be activated.

U.S. Pat. No. 4,937,557 of Tucci et al. describes a RO system for purifying water in which a pair of conductivity elements are disposed on either side of a membrane. A signal generator supplies a square electrical waveform to the input of the conductivity elements. The output signal of each conductivity element is compared to determine the water impurity level and an alarm is activated if their difference exceeds a predetermined value. The Dolan '774 and Tucci '557 patents are provided for background purposes.

A more comprehensive description of purification systems that are currently used and how they work is discussed and illustrated in the publication of "ULTRAFILTRATION for the Water Quality Improvement Industry", by Irving Haug, 1991, published by Water Quality Association, incorporated herein by reference. This publication outlines various purification systems, the respective problems incorporated with each and general terminology used in the field.

The following articles entitled "Clean Water-Some Practical Considerations," written by Clifford K. Monzeglio, Solid State Technology, February 1972, "Reverse Osmosis For Purification of Water," by A. R. Mills, Solid State Technology, Jul. 1990, and "Ultrapure Water and Reverse Osmosis Technology," by Radovan Kohout, Microsystems International Ltd, Ottawa, Canada, contains useful information regarding reverse osmosis systems, and can be consulted in order to put the present invention into proper perspective. These articles, likewise, are incorporated herein by reference.

DISCLOSURE OF THE INVENTION

Briefly described, the present invention comprises a purification system for monitoring the filtration of an aqueous fluid, wherein the system comprises a filter element for filtering the aqueous fluid as the fluid moves through the system, a plurality of transducer elements for producing electrical signals that are representative of characteristics of the aqueous fluid, and electronic circuitry for conditioning some of the transducer element signals. The electronic circuitry also normalizes one of the conditioned signals relative to another signal. In a water purification embodiment of the invention, the transducer elements include conductivity, flow and temperature transducers, and the conductivity and flow signals are normalized relative to the temperature signal.

An advantage of the present invention is its ability to compensate for variations in certain characteristics of the aqueous fluid. In some water purification systems, the conductivity and flow of water are dependent upon water temperature. Thus, the system's ability to adjust or normalize conductivity and flow readings relative to temperature fluctuations greatly enhances the system accuracy, as well as its ability to monitor system performance.

In preferred form, the electronic circuitry of the purification system includes a digital computer for normalizing the conditioned signals. Additionally, discrete logic components are provided to work in conjunction with the digital computer in controlling system components. The discrete logic components provide a low voltage, hard wired control system for ensuring operation of the system should the computer fail.

According to an aspect of the invention, the purification system includes a conditioned signal status indicator for indicating the status of each conditioned signal. An operator merely has to periodically watch the status indicator to know how the system is performing. For example, in the water purification embodiment of the invention, where conductivity, flow, temperature, and pressure readings are taken at various points in the system, a monitor displays each variable's reading in a graphic display that is easily understood. The system also includes a system alarm for indicating that a normalized signal has moved outside a preset limit. The system alarm includes a graphic readout as well as an audible signal. Preferably, the system alarm is a real time alarm that indicates when a normalized signal has moved outside a preset limit.

According to another aspect of the invention, the electronic circuitry includes an analog filter. The analog filter is adapted to compare normalized transducer signals to previously normalized transducer signals, in order to check the integrity of the filter element.

By comparing current real time signals to previous signals, the system is able to show system trends, a comparison that is helpful in anticipating system failure, as well as in evaluating system performance.

Preferably, the analog filter includes a data bank or data warehouse reference wherein successive normalized transducer signals are averaged to create a system norm for a particular characteristic of the aqueous fluid. The normalized transducer signals are compared to the system norm, to create an historical trend status for that particular characteristic.

The analog filter is adapted to average successive normalized transducer signals over predetermined time intervals, to create system norms. The analog filter averages the system norms over predetermined time intervals, to create additional system norms. The additional system norms are useful in evaluating long term performance of the system.

According to an aspect of the invention, the electronic circuitry for conditioning the conductivity transducer element signal collects signals from the conductivity transducer element by exciting the element with an AC triangular electrical waveform of a predetermined frequency and amplitude. Prior art systems have utilized an AC square electrical waveform. The present invention's triangular waveform achieves improved signal performance, as discussed herein.

Preferably, the electronic circuitry for conditioning the conductivity transducer element signal includes the following: a feed terminal, a product terminal, a feed signal output terminal, and a product signal output terminal; a pair of transducer elements that sense conductivity, the first element being connected in series with the feed terminal, and the second element being connected in series with the product terminal; a pair of current sources that produce temperature compensated AC constant currents including input and output terminals, the first source output terminal is connected in series with the feed terminal, and the second source output terminal is connected in series with the product terminal; means for producing an AC triangular electrical waveform including an output terminal, which is connected in series with the input terminals of the first and second current sources; at least a pair of precision resistors, the first resistor being connected in parallel with the first element at the feed terminal, and the second resistor being connected in parallel with the second element at the product terminal; at least a pair of unity gain amplifiers including input and output terminals, the first amplifier input terminal being connected in series with the feed terminal, and the second amplifier input terminal being connected in series to the product terminal; at least a pair of half wave rectifiers including input and output terminals, the first rectifier input terminal being connected in series to the output terminal of the first amplifier, and the second rectifier input terminal being connected in series to the output terminal of the second amplifier; at least a pair of low pass filters including input and output terminals, the first filter input terminal is connected in series to the output terminal of the first rectifier, and the second filter input terminal is connected in series to the output terminal of the second rectifier; and at least a pair of conductivity signal output terminals, the first output terminal connected in series to the output terminal of the first low pass filter, and the second output terminal connected in series to the output terminal of the second low pass filter.

According to an aspect of the invention, the electronic circuitry for conditioning the transducer element signals is designed to create DC signals from the transducer elements having a value from 0 volts to 1.2 volts.

According to an aspect of the invention, the electronic circuitry for conditioning the pressure transducer element signal suppresses an induced common mode voltage in the pressure transducer element signal by applying a feedback loop.

The pressure transducer element includes positive and negative input terminals and positive and negative output terminals, and the electronic circuitry includes a power supply with a common voltage terminal, a positive voltage input terminal, a positive voltage output terminal, and a pressure signal output terminal connected in series with the output terminal of the low pass filter.

Preferably, the feedback loop includes an input terminal, which is connected in series to the power supply common voltage terminal, and an output terminal, which is connected to the pressure element negative input terminal, to eliminate the common mode voltage in a resistive bridge of the pressure transducer element.

The electronic circuitry also includes an amplifier having an input terminal, which is connected in series to the pressure transducer positive output terminal, and an outlet terminal. The circuitry also includes a low pass filter having an input terminal, which is connected in series with the output terminal of the amplifier; and an output terminal.

According to another aspect of the invention, the flow transducer includes a periodic square wave voltage source and the electronic circuitry for conditioning the flow transducer signal includes a leading edge detector circuit in series with the periodic square wave voltage source for determining the time delay between the leading edges of each wave of the periodic square wave voltage. The circuitry also includes a pulse train circuit in series with the leading edge detector circuit for producing a voltage that varies relative to the frequency of the time delay detected by the leading edge detector circuit and a two stage low pass filter circuit in series with the pulse train circuit for converting the varying voltage into a DC signal.

Preferably, the flow transducer element further comprises a paddle wheel rotatable about its center axis for placement within the aqueous fluid, a magnet positioned outwardly from the center axis on the paddle wheel, an inductive element, positioned adjacent the paddle wheel, for producing a pulsating voltage signal in response to the rotating magnet, and a transistor in series between the inductive element and the leading edge detector circuit, for transforming a pulsating voltage to the periodic square wave voltage.

The flow transducer element further includes an amplifier positioned between the inductive element and the transistor.

The present invention also comprises a method or process for purifying an aqueous fluid. The method includes the steps of passing aqueous fluid through a filter element and sensing characteristics of the aqueous fluid with a plurality of transducer elements. Each transducer element is adapted to produce an electrical signal representative of a characteristic of the aqueous fluid. The method further includes the steps of conditioning the electrical signals from the plurality of transducer elements, normalizing one of the conditioned signals relative to another conditioned signal, and comparing the normalized signal to a preset limit for that signal to determine if the normalized signal is within an acceptable range.

Accordingly, it is an object of the present invention to provide a highly accurate monitoring and control system for an aqueous fluid purification system.

Another object of the invention is to provide electronic circuitry for collecting and conditioning transducer element signals that is simple in design, inexpensive to manufacture, yet is more accurate than prior art circuitry.

Another object of this invention is to provide highly reliable discrete logic components that can automatically and independently control the system.

Further objects and advantages of this invention will become apparent from a consideration of the drawings and ensuing description, and the claims, which are incorporated herein as part of the disclosure of the invention.

BEST MODE OF THE INVENTION

While the present invention can be used with several types of fluid purifying filters, the invention is illustrated for use in a reverse osmosis (RO) system. Further, for simplicity of the below description of the invention, water is used as the aqueous fluid, except where noted.

Purification System

Figure 1:
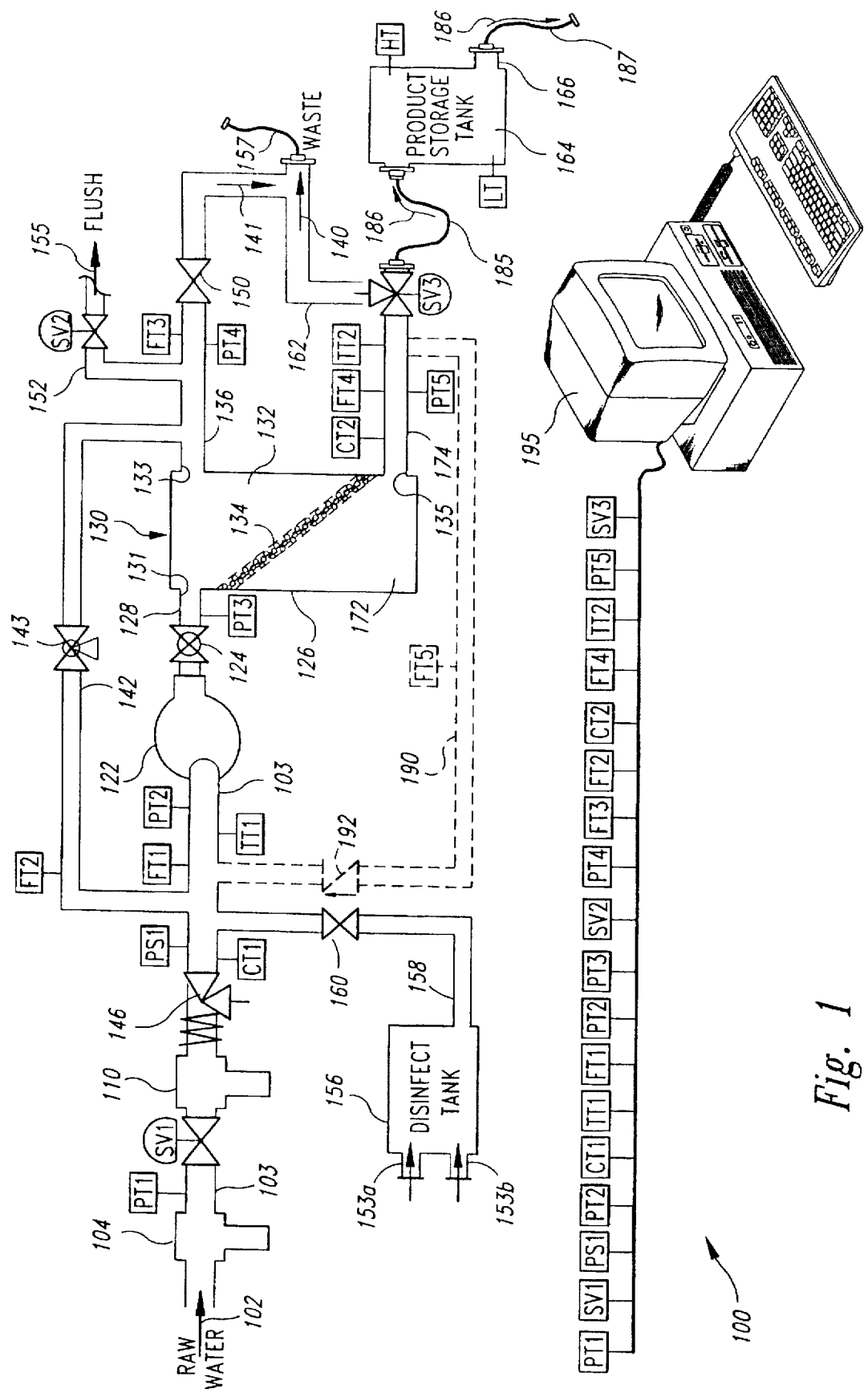
FIG. 1 is a schematic diagram of an aqueous fluid purification monitoring and control system of the present invention.

Referring to FIG. 1, the purification system of the present invention is indicated generally at 100. Raw water, indicated by arrow 102, enters system 100 through a primary conduit 103. The raw water is the water to be purified and can come from any number of sources such as a municipal water supply or any other potable water source, or from a waste water supply, such as a byproduct from an industrial process. A first prefilter 104 and a second prefilter 110 remove physical contaminants from the raw water. As typically configured, first prefilter 104 includes a multimedia filter for removing particles larger than 5–10 microns and a water conditioning filter for removing unwanted chemicals from the water. For example, unwanted iron, manganese, calcium, and other dissolved solids can be removed from the water by filtering through layers of media such as ion exchange, manganese green sand, and various water quality control devices. Second prefilter 110 includes a carbon filter for removing chlorine.

An inlet shutoff valve SV1 is positioned in conduit 103 between first prefilter 104 and second prefilter 110. Shutoff valve SV1 opens and closes to allow raw water 102 into the system 100. Primary conduit 103 leads from second prefilter 110 to a high pressure pump 122. Pump 122 can be any suitable commercially available high pressure pump. Pump 122 increases the feed water pressure to a level sufficient for high pressure filtration, preferably in the range of 210–300 psi. An inlet conduit 128 connects pump 122 to a RO filter vessel or manifold 130. A throttle valve 124 is positioned in inlet conduit 128 and regulates the water pressure at the inlet to RO filter vessel 130. Preferably, the feed water pressure is maintained in a range from 210 to 300 psi.

RO filter vessel 130 is a commercially available filter housing, such as is available from Osmonics, Incorporated, Minneapolis, Minn. USA. Pressure vessel or manifold 130 includes an inlet port 131, a first outlet port 133 and a second outlet port 135. An internal solid cast membrane 134 separates the interior of manifold 130 into an inlet chamber 132 and an outlet chamber 172. Impure water enters inlet chamber 132 through port 131 and either passes through the membrane 134 or exits through port 133. The water that interacts with membrane 134 passes into outlet region 172, where it exits through port 135. The water that exits first outlet port 133 is referred to as "waste water" and the water that exits through port 135 is referred to as "product water."

A waste conduit 136 leads from port 133 to drain, which is indicated by arrow 141. A throttle valve 150 is positioned in waste conduit 136 to reduce the waste water pressure, while maintaining sufficient back pressure to manifold 130. During normal operation of the system, waste water exits the system through conduit 136.

A waste feedback conduit 142 leads from waste conduit 136 to the inlet side of the pump 122. Waste feedback conduit 142 recirculates waste water back to pump 122 for further filtration through manifold 130. A flow control valve 143 is provided in waste feed back conduit 142. Within the primary conduit 103, a pressure regulator valve 146 is positioned to maintain the recirculation pressure in waste feedback conduit 142 at a pressure greater than the pressure at the inlet side of primary conduit 103.

A flush conduit 152 is connected to waste outlet conduit 136. Flush conduit 152 contains a flow valve SV2 that opens to allow maximum waste water flow from the system during flush operation, discussed later.

A product conduit 174 leads from outlet port 135 to a three-way divert valve SV3. A conduit 162 connects product conduit 174 to waste conduit 136, when valve SV3 is in a first position. In its second position, valve SV3 connects product conduit 174 to a discharge hose 185. During normal operation, discharge hose 185 is connected to a storage tank 164. Storage tank 164 includes a high tank level sensor HT and a low tank level sensor LT. An auxiliary pump (not shown) pumps purified water from storage tank 164, out exit port 166 into another discharge hose 187, which is connected to the downstream system.

In some applications, it may be desirable to recirculate purified water through the system. In such applications, valve SV3 is shifted to its third position, which blocks flow altogether. Three way divert valve SV3 operates in conjunction with a product recirculation conduit 190. Conduit 190 connects product conduit 174 with primary conduit 103 at the inlet side of pump 122. A check valve 192 prevents reverse flow in recirculation conduit 190. When it is desired to recirculate purified water, valve SV3 is shifted to its third position, to redirect product water through conduit 190. An example of an application where it may be desirable to recirculate the purified product water is intermittent water use without a storage tank. However, waste feedback conduit 142, as well as the product feedback conduit 190, can be eliminated and are not necessary to the invention.

System 100 also includes a disinfect tank 156. Tank 156 includes a first inlet port 153a and a second inlet port 153b. The outlet of tank 156 is connected to primary conduit 103 via a conduit 158. Conduit 158 includes a valve 160 for preventing direct water flow from primary conduit 103 to disinfect tank 156. Waste conduit 136 includes a hose connection 157 for connection to inlet port 153a, and discharge hose 185 off of valve SV3 can be detached from storage tank 164 and connected to inlet port 153b. With hoses 157 and 185 connected to disinfect tank 156, the system is configured for operation of a disinfect cycle, discussed later.

As shown in FIG. 1, the control instrumentation of system 100 includes a first pressure transducer PT1 positioned before prefilter 110, a second pressure transducer PT2 positioned in primary conduit 103 before pump 122, a third pressure transducer PT3 positioned in inlet conduit 128, a fourth pressure transducer PT4 positioned in waste conduit 136, and a fifth pressure transducer PT5 positioned in product conduit 174.

A first conductivity transducer CT1 is positioned in primary conduit 103 after prefilter 110. A second conductivity transducer CT2 is positioned in product conduit 174. Conductivity transducers CT1, CT2 are the primary transducers used to measure the performance of filter membrane 134.

A first flow transducer FT1 is positioned in primary conduit 103 after prefilter 110, a second flow transducer FT2 is positioned in waste feedback conduit 142, a third flow transducer FT3 is positioned in waste conduit 136, and a fourth flow transducer FT4 is positioned in product conduit 174. A fifth flow transducer FT5 would be provided in product feedback conduit 190 if such conduit were included with the system.

A first temperature transducer TT1 is positioned before pump 122, and a second temperature transducer TT2 is positioned in product conduit 174. Transducers TT1 and TT2 allow for temperature compensation of the flow and conductivity signals received from transducers CT1, CT2, FT1, FT2, FT3, and FT4.

A pressure switch PS1 monitors the pressure after the prefilter 110. If pressure switch PS1 senses a pressure drop below a mechanical preset limit, the pump 122 is shut down after a six second delay.

Pressure transducers PT1, PT2, PT3, PT4, PT5, conductivity transducers CT1, CT2, temperature transducers TT1, TT2, and flow transducers FT1, FT2, FT3, FT4 all provide an electrical signal that is representative of the particular characteristic of the water being sensed. Each transducer signal is sent to a digital computer 195. Digital computer 195 monitors the signals from the transducers and in response thereto controls valves SV1, SV2, SV3, and pump 122, in a manner discussed later. Digital computer 195 also provides a visual read-out of system conditions and alarm statuses, and performs historical trend analysis that is useful in determining the efficiency of the filter membrane over time as well as detecting serious problems in the system.

While four different transducers are provided in the disclosed system, in particular applications, the instrumentation circuitry of system 100 can be modified to include fewer transducers. Where a particular characteristic of the fluid does not vary appreciably, it may not be necessary to monitor that characteristic. For example, industrial applications may have a water source with a relatively constant flow rate and temperature. In such applications, a modified version of system 100 need only sense conductivity and pressure in order to monitor and control the purity of the product water.

Other applications may require more than four different transducers, or may require different types of transducers for monitoring other characteristics of the fluid. For example, Ph and ion-specific data, such as chlorine concentrations, are measured in a variety of applications in which the present invention is applicable.

The monitoring and control system of the present invention is designed to be compatible with a variety of different fluid purification systems, regardless of the particular fluid characteristics being sensed, regardless of the number of transducers, and regardless of the particular type of filters or screens used in the system. It is only necessary that one of the characteristics varies in response to another of the characteristics, for it is such variance that the present invention compensates for.

Figure 2:
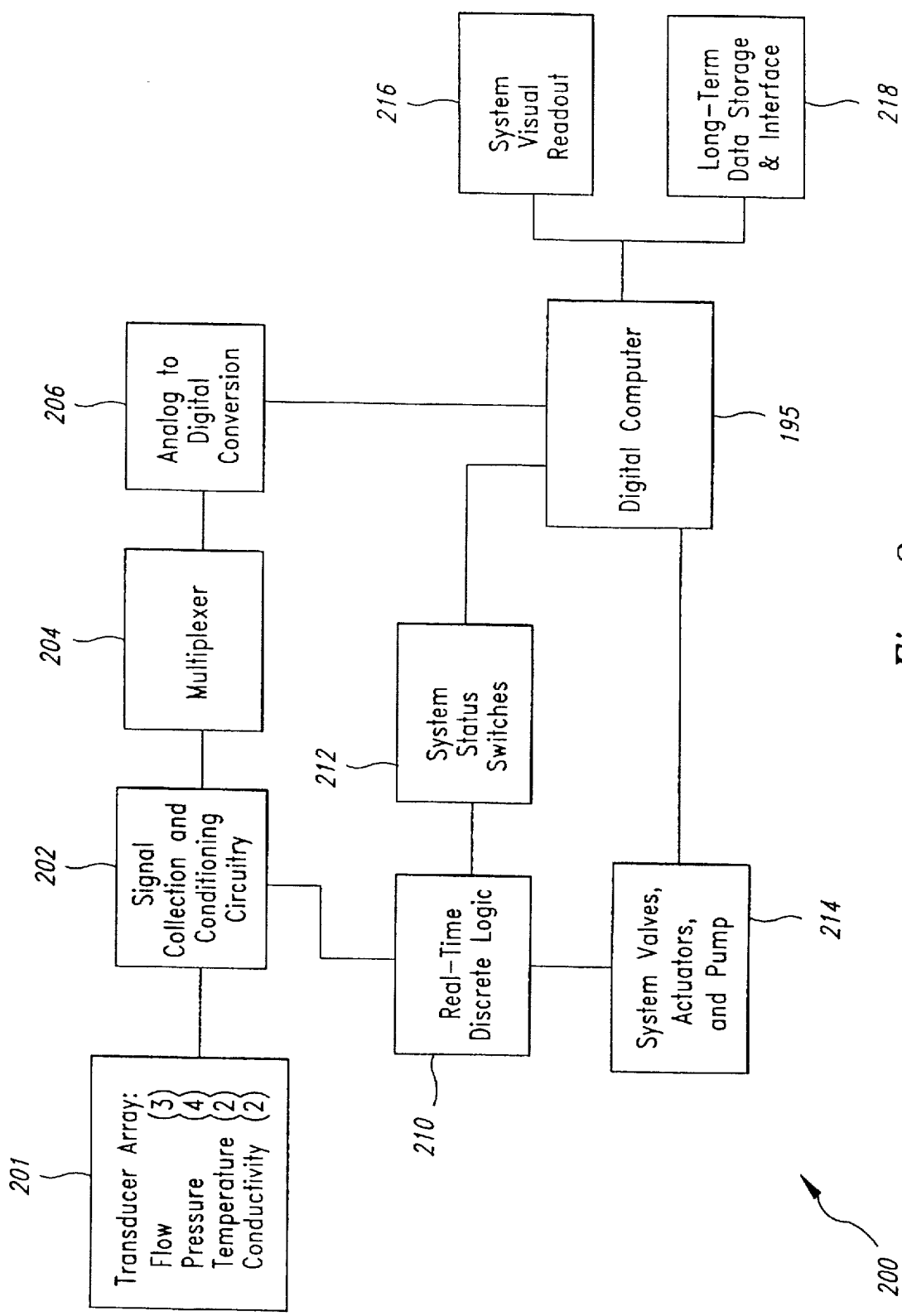
FIG. 2 is a block diagram showing the architecture of the purification system FIG. 1.

FIG. 2 is a block diagram showing the control system architecture 200 for the RO system 100 of FIG. 1. The transducers discussed with reference to FIG. 1 are collectively indicated as a transducer array 201. Each transducer of array 201 produces an electrical signal that is representative of a particular characteristic of the fluid. The electrical signals from transducer array 201 are collected and conditioned by electronic circuitry 202, discussed in more detail with reference to FIGS. 3–5.

Certain conditioned signals from circuitry 202 are simultaneously sent to realtime discrete logic components 210 and a multiplexer circuit 204, while other conditioned signals are only sent to the multiplexer. Discrete logic components 210 sense the status of system switches such as low feed water pressure, storage tank empty/full, and prefilter lockout. If the storage tank is low, its pump will be on. If the storage tank is high, its pump will turn off. The signal from temperature transducer TT1 is used to indicate when the raw water temperature is in excess of a safe level. If the incoming water temperature is excessively high, the discrete logic components will shut down the pump in order to avoid damage to the filter membrane. Discrete logic components 210 also control other system component actuation in order to assure that the system is fail safe in the event of a computer crash. During normal operation, the computer does not directly actuate any system component, but if a warning status occurs of a certain type, the computer can shutdown the system.

The various conditioned analog transducer signals are sequentially sampled by multiplexer 204, approximately ten times per minute, and converted to a digital format by an analog to digital converter 206. The multiplexer 204 is intended for digital signal multiplexing, but is suitable for use with analog signals as well, so long as the signal is positive going and small compared to the supply voltage. All of the conditioned analog signals on the multiplexing data bus of the system fall within a range of 0 to 1.2 volts.

It is common in the art for analog signals to be converted into digital signals before they are multiplexed. By multiplexing the analog signals directly, only one analog to digital conversion circuit is necessary. The reduction in cost becomes more pronounced as the number of transducers increases.

Digital computer 195 provides a system visual readout 216 for each transducer reading, correcting for full-scale and zero-offset errors. These readings are stored in a long-term data storage and interface 218. The data is stored in several format groupings that are used for system troubleshooting. The stored data provides a basis for establishing a "system norm" that is based directly upon the analog signal inputs. Temperature normalized data, particularly that which relates to conductivity and to flow through the membrane, is also stored along with actual real-time data in the system memory. Current operating parameters are compared to the system norm, in order to check the integrity of the filter. This is referred to as the "analog filter." Analog filtering is actually based on comparing normalized real-time data to previous normalized data stored in a data bank, a concept that is defined as data bank or data warehouse referencing. The data bank itself is based upon six second data readings, when in the alarm mode, one-minute averages of ten successive samples, when in the warning mode, ten minute averages of ten successive samples of one minute averages, stored under all conditions, and one hundred minute averages of the ten minute data.

Each new reading from the multiplexer circuit is then compared to the averaged data, and if a sudden change is detected greater than a predetermined value, the system operator is notified by an alarm or warning signal. Such rapid changes are usually indicative of a major system failure, such as a rupture in the filter membrane. Conversely, if the new data changes slowly over time, it would likely indicate the need for system cleaning. An interpretation of the presented data can also indicate that the basic system is operating normally, but that a single data channel may be malfunctioning. By means of the "analog filter", we are able to detect those failures that have occurred abruptly and are able to predict certain categories of those failures which are imminent. Thus, the system is able to do self-diagnosis, provided the computer remains functional. Under normal conditions, all parameters are within preset limits, and the computer presents a numeric display of each system variable. If there is a drift of any system variable outside of its preset limit, the computer initiates a warning to the system operator. A simple glance at the display allows the operator to readily see the source of the problem.

Digital computer 195 creates process variables by automatically normalizing particular transducer element signals relative to measured temperature transducer element signals, calculating zero offset values, and calculating gain values. The process variables are used by the digital computer to normalize the efficacy and efficiency values for the purification system.

Preferred circuitry for multiplexer 204 and analog to digital converter 206 is an integrated circuit primarily designed for a multimeter, such as a 7135, 4½ digit unit, manufactured by Harris Semiconductor, USA. The multimeter analog to digital converter uses a dual slope method and provides automatic zero correction and self calibration with each conversion. The multimeter converter costs a fraction of a conventional analog to digital integrated circuit converter, yet this cost reduction is accomplished without compromising the accuracy or reliability of the water purification monitoring and control system.

TRANSDUCER ELEMENTS

Figure 3:
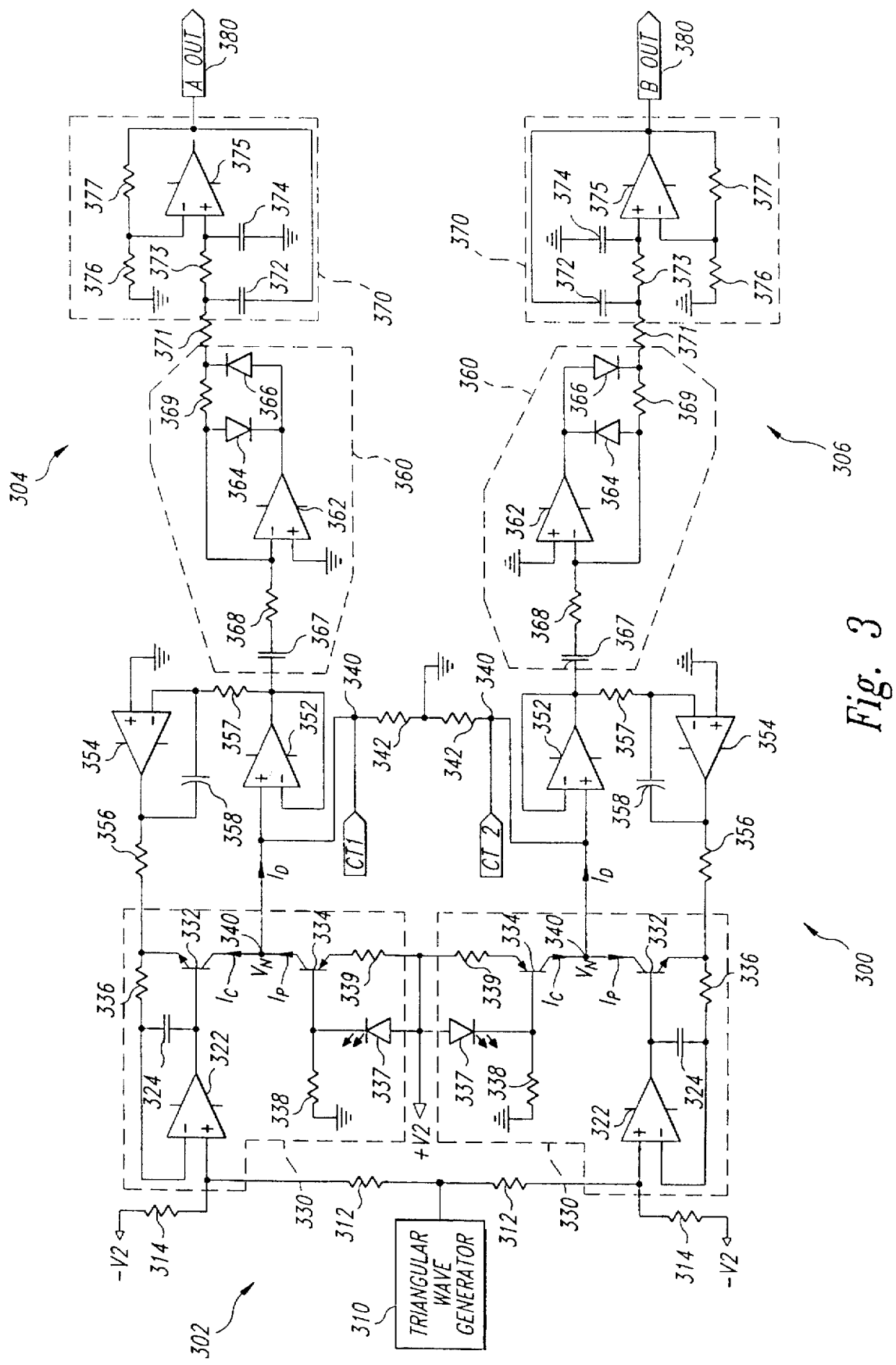
FIG. 3 is an electrical schematic diagram of the conductivity transducer signal conditioning circuitry of the system of FIG. 1.

FIG. 3 shows the overall architecture of a conductivity signal conditioning circuit 300 that is part of the signal condition circuitry 202 (FIG. 2). Any reference to voltage inputs of $\pm V1$, or $\pm V2$, is representative of $\pm 5$ volts or $\pm 12$ volts, respectively. The conductivity signal conditioning circuitry 300 has three principle parts: a triangle wave current source, indicated generally at 302, and a pair of conditioning legs, indicated generally at 304, 306. Triangle wave current source 302 includes a triangular waveform generator 310 and a pair of temperature compensated current drivers 330. The triangular waveform generator 310 drives current drivers 330 in a manner well circuit known in the art.

Because current drivers 330 are identical and conditioning legs 304, 306 are identical, the following will describe only the lower current driver 330 and conditioning leg 306. Corresponding current driver 330 and conditioning legs 304, 306 are interchangeable, in that either can sense conductivity of the feed water or the product water. The output of the triangular waveform generator 310 drives the base of an NPN modular transistor 332 through a buffer amplifier 322 to control the temperature compensated current driver 330. The output of the triangular waveform generator 310 forms a nominal frequency of 1K hertz. Current to the modular transistor 332 is supplied by a control transistor 334 driven by a supply voltage V2 that forms a constant current source driving a product input node or terminal 340 between the transistors 332 and 334.

The product input node 340 turns the output of the temperature compensated current driver 330 and supplies a current $I_D$ equal to the difference between the control transistor current $I_C$ and the modular transistor current $I_m$. The differential current $I_D$ from the node 340 drives the parallel combination of a precision resistor 342 and the conductivity transducer CT2, which acts as a variable resistor. The voltage $V_N$ at the node 340 equals the differential current $I_D$ multiplied by the resistance of precision resistor 342 parallel to the resistance of the conductivity transducer CT2. Thus, the node voltage $V_N$ is controlled by the conductivity transducer CT2. Conductivity transducer CT2 varies as a function of impurity in the product water from 1 µS to 100 µS. Precision resistor 342 is chosen such that the variation in the resistance of conductivity transducer CT2 gives $V_N$ a voltage that varies with ±1 V.

A buffer amplifier 352 amplifies voltage $V_N$ to give a buffered output voltage for input to a half wave rectifier 360. The half wave rectifier 360 is a conventional circuit formed from an amplifier 362 in a feedback configuration with an opposed pair of parallel diodes 364, 366 at its output. The half wave rectifier 360 clips the triangular buffered output voltage from the buffer amplifier 352 to produce a modified, peak-limited waveform. An output filter 370 filters the peak-limited waveform to produce a conditioned, substantially sinusoidal output signal at conditioned signal output terminal 380.

Some prior art systems have used a square electrical waveform to excite transducer elements to sense conductivity. Through experimentation, applicants have determined that a square electrical waveform can produce deleterious capacitive effects in the transducers and their associated circuitry. The effects reduce the ability to precisely and accurately measure conductivity. With the present invention, the triangular waveform excitation of each conductivity transducer CT1, CT2 reduces capacitive effects and increases the overall precision and accuracy of conductivity measurements.

For further stability and accuracy, the triangular current drivers 330 are temperature compensated. Temperature compensation ensures that the circuit can provide a closely controlled AC current of predetermined frequency and amplitude without giving rise to a significant DC component. Otherwise, the node voltage $V_N$ would drift, causing reduced sensitivity and increased distribution in the buffer amplifier 352, half wave rectifier 360, and the output filter 370. The collector current of NPN modular transistor 332 is exactly matched by the collector current of NPN control transistor 334, so that there is no net average DC current applied to the probes. Any DC current that is present would result in corrosive degradation of the probes. PNP transistor 334, LED 337, and resistor 339 create a temperature compensated DC source, since the dependence of forward voltage of both are nearly identical, resulting in a nearly constant voltage drop across resistor 339.

The reduction of the DC component, to levels relatively small as compared to the AC component, is achieved by carefully selecting the operating points of the circuit. To virtually eliminate the DC component of the drive current $I_D$ to the feed and product conductivity transducers CT1, CT2, the matched collector currents of transistors 332, 334 have their average current level forced to zero by negative feedback of the DC component of output voltage to emitters of transistors 332, 334 with op amp 354. By forcing the collector current average to zero, the observed DC component is less than 0.1% of the AC component. Suppressing the DC component reduces deposits on the conductivity transducer, which can decrease its performance and longevity.

The conductivity of the feed water 102 is typically 10 times greater than that of the product water 186 because the resistive values of the precision resistors 342 differ by a factor of ten. To compensate for the difference in conductivity between the raw water 102 and product water 186, the closely controlled AC currents for the feed and product conductivity transducer terminals CT1, CT2 are typically set at 100 micro amps and 10 micro amps, respectively.

Figure 4:
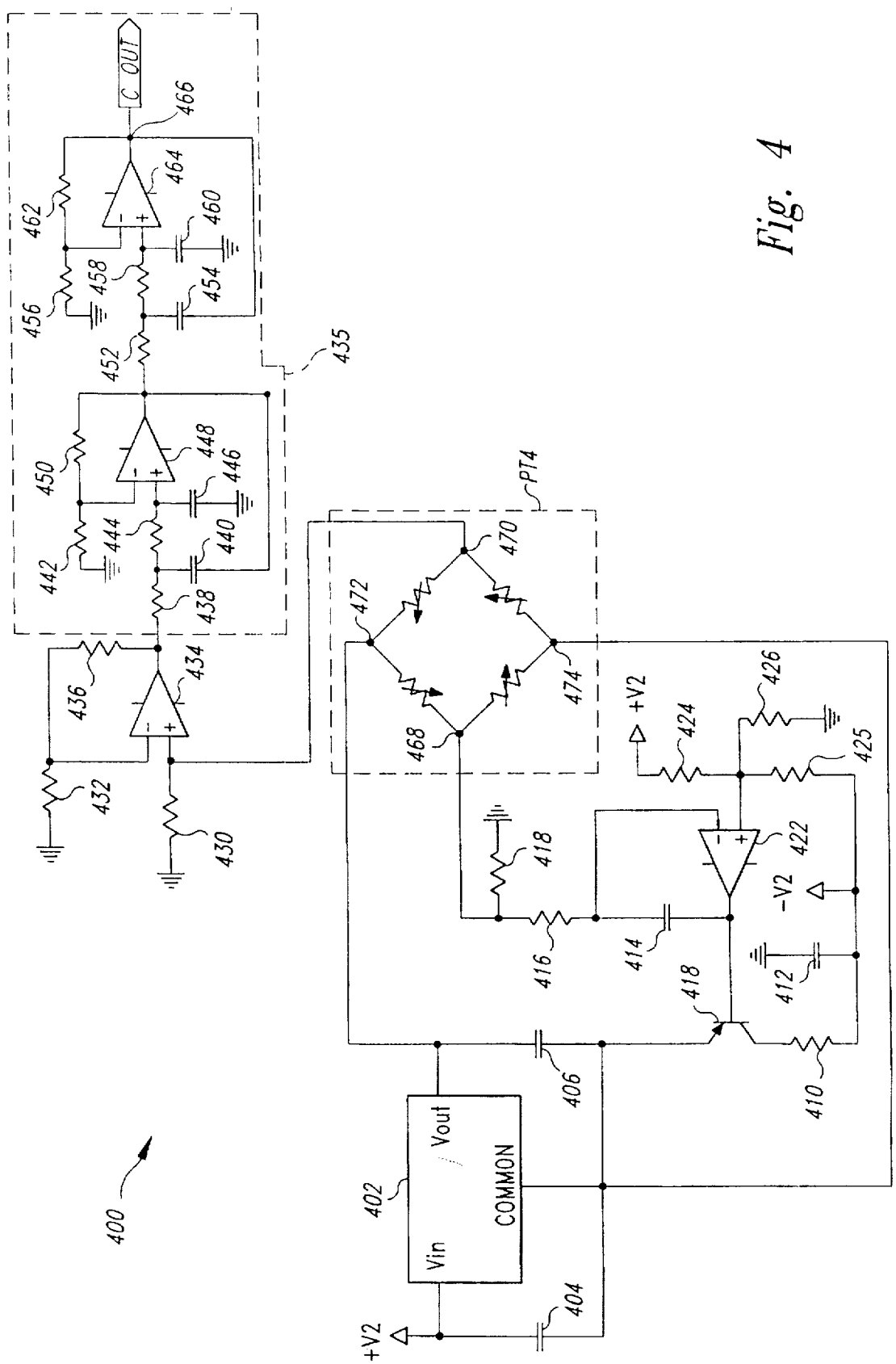
FIG. 4 is an electrical schematic diagram of the pressure transducer signal conditioning circuitry of the system of FIG. 1.

FIG. 4 shows the overall architecture of a pressure sensor conditioning circuit 400, which is part of the signal conditioning circuitry 202 (FIG. 2). Pressure transducer PT4, positioned in waste conduit 136, is representative of the pressure transducers discussed with reference to FIG. 1. Pressure transducer PT4 is a four terminal, strain gauge bridge driven by 5 volts from a temperature compensated floating regulated power supply 402. The strain gauge bridge is a conventional circuit known in the art.

The driving voltage is applied at positive input terminal 472 and negative input terminal 474. The output signal voltage is measured between positive and negative output terminals 468, 470 and typically provides less than 50 millivolts. The positive output terminal 470 and negative output terminal 468 are between 2 to 3 volts above ground even in the absence of a signal voltage because of the common mode voltage induced by the excitation voltage.

In prior art circuits, the common mode voltage in a pressure transducer output signal is commonly suppressed with an instrumentation amplifier circuit. With the common mode voltage suppressed, the output signal of the pressure transducer appears as 0 to 50 millivolts with respect to ground. By contrast, conditioning circuit 400 removes the common mode voltage in the output terminals 468, 470 of the pressure transducer by feeding back the voltage from the negative output terminal 468, thereby eliminating the need for an instrumentation amplifier circuit.

Negative output terminal 468 of the pressure transducer PT4 is connected to an inverting input of op amp 422 through resistor 416. The non-inverting input of op amp 422 is referenced to ground potential through resistor 426. A capacitor 414 feeds back AC components of the output voltage of op amp 422 so that the op amp acts as a low pass filter.

The output of the op amp 422 goes negative and drives the base of transistor 418 to turn on the transistor 418 when the transducer negative output terminal 468 goes positive with an induced common mode voltage. As transistor 418 turns on, it pulls the common terminal of the power supply 402 down by the amount of common mode voltage at negative output terminal 468. Consequently, the excitation voltage seen at the positive and negative input terminals 474 and 470, respectively, of the pressure transducer 428, is equally offset. Typically the offset creates a measured DC signal at the positive input terminal 472 of +2 to +3 volts and at the negative input terminal 474 of −3 to −2 volts with respect to ground.

Subsequently, the voltage of the negative output terminal 468 has shifted to, or near, ground.

As discussed above, the positive output terminal 470 supplies a voltage about 0 to 50 millivolts above the negative output terminal 468. Because the negative output terminal 468 is at ground, the positive output terminal is at about 0 to 50 millivolts above ground. The common mode voltage is thus removed from the voltage at the positive output terminal 470. Because the induced common mode voltage is suppressed in the positive output terminal 470 and negative output terminal 468, the output voltage of op amp 422, which was negative, retreats to zero and turns off the base of transistor 418.

Capacitor 414 is used to dampen oscillations as a feedback loop pulls the potential of negative output terminal 468 to zero with respect to ground. The signal range at the output terminals 470 and 468 of the pressure transducer is now 0 to 50 millivolts with respect to ground and the common mode voltage component is below the millivolt range.

The positive output terminal signal is amplified positively with op-amp 434 and resistors 430, 432, and 436. The positively amplified signal is next passed through a conventional two stage low pass filter 435 to further condition the output signal. Low pass filter 435 comprises op-amps 448 and 464; resistors 438, 442, 444, 450, 452, 456, 458, and 462; capacitors 440, 446, 454, and 460. Finally, the positively amplified and filtered transducer output signal is passed to the pressure signal output terminal 466.

A typical instrumentation amplifier is configured with three op-amps. The present invention has only two op-amps 448, 464. There are, therefore, only two sources of offset voltage error rather than three in the typical instrumentation amplifier. Further, there are seven precision resistors in a typical instrumentation amplifier, while only two are required in the present configuration. Therefore, the use of the feedback loop and the floating regulated power supply 402 to suppress the common mode voltage in a pressure transducer 428 reduces the number of electronic components, lowers manufacturing costs, and improves reliability of the circuitry. The elimination of the need for an instrumentation amplifier circuit to suppress the common mode voltage is accomplished without sacrificing performance. The performance of the feedback loop circuitry includes extremely low output impedance and extremely high input impedance, finite and accurate gain, and a common mode rejection ratio greater than 100 Db.

Figure 5:
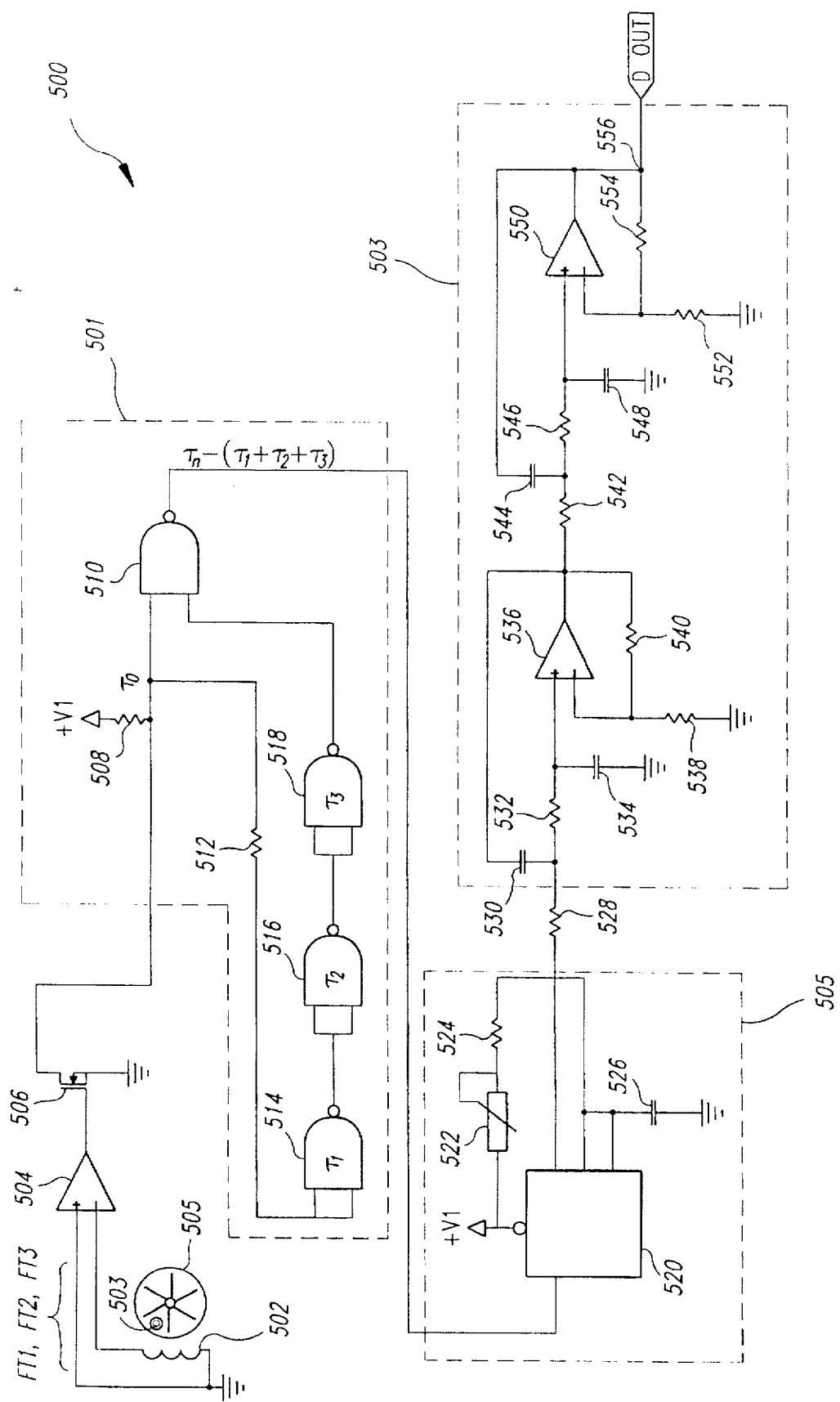
FIG. 5 is an electrical schematic diagram of the flow transducer signal conditioning circuitry of the system of FIG. 1.

Referring to FIG. 5, flow transducer elements FT1, FT2, FT3 each sense water flow by passing a rotating magnet past an inductive element 502. The passing magnet produces a signal in the inductive element 502 that is conditioned by a temperature sensor conditioning circuit 500, part of the signal condition circuitry 202 (FIG. 2). Flow transducers FT1, FT2, FT3 are similar and each include their own conditioning circuitry.

The inductive element 502 senses one or more rotating magnets 503 attached to a paddle wheel 505, which is placed in flowing water. Each flow transducer element FT1, FT2, FT3 is calibrated so that every rotation of magnet 503 represents a set amount of fluid flow past the transducer. In response to movement of magnet 503, inductive element 502 produces a pulsating voltage signal representative of the fluid flow. Each voltage pulse is passed to the inverting input of an op amp 504. Because the non-inverting input of op amp 504 is referenced to ground, the output of op amp 504 pulses negative for every positive signal pulse received from inductive element 502. When the output from op amp 504 pulses negative, it turns on the base of transistor 506 for a time duration of $\tau_n$ and produces an input to a leading edge detector circuit 501.

The negative pulse input from transistor 506 provided to leading edge detector circuit 501 switches the direct input to NAND gates 510 and 514 from high (positive) to low (negative) at time $\tau_0$. While the direct input to NAND gate 510 stays low for time duration $\tau_n$, the negative leading edge signal input to NAND gate 514 switches high to NAND gate 516 at $\tau_1$, low to NAND gate 518 at $\tau_2$, and high to second input of NAND gate 510 at $\tau_3$. Consequently, NAND gate 510 produces a positive transition output pulse after time duration $\tau_n$. The positive transition output pulse has a width defined by the leading edge time differential developed between the negative leading edge direct input signal to NAND gate 510 at time $\tau_0$ and the delayed positive leading edge second input signal produced by NAND gates 514, 516, 518 after time duration $(\tau_1+\tau_2+\tau_3)$.

After time duration $\tau_n$ has past, the negative output pulse from op amp 504 switches to a positive voltage and the transistor 506 turns off. The voltage passes through a resistor 508, which raises the inputs to the NAND gates 510 and 514 back to high. The frequency of the positive transition output pulses from NAND gate 510 provides the necessary information for a variable frequency pulse train 505 and a two stage low pass filter 503.

Within the variable frequency pulse train 505, a one shot multi-vibrator 520 proportionally converts the digitally differentiated signal into a pulse train of precisely controlled voltage and time duration. The controlled voltage at the output of the one-shot multivibrator is determined by the regulated supply voltage source. The controlled pulse width is determined by the resistors 522, if used, and 524, and capacitor 526. Consequently, voltage increases from pulse train 505 as frequency increases from leading edge detector circuit 501, and the spin rate increases from the flow transducer, as water flow rate increases.

The constant voltage of the variable frequency pulse train 505 is linearized into a variable DC signal by passing the pulses through a conventional two stage low pass filter 503. The conventional two stage low pass filter 503 is know in the art and comprises op amps 536 and 550; resistors 528, 532, 538, 540, 542, 546, 552, and 554; and capacitors 530, 534, 544, and 548. The filtered flow signal is then passed to the flow signal output terminal 556.

The use of digital and analog components, in combination with the flow element conditioning circuitry, creates a precise signal that can be up to ten times more accurate than the accuracy provided by an unconditioned inductive flow element. Moreover, the highly accurate flow element circuitry of the present invention is highly reliable and relatively inexpensive to manufacture.

DISCRETE LOGIC COMPONENTS

Referring to FIGS. 6A–6G, the discrete logic components are shown divided into seven different control circuits. Since each circuit is based on discrete logic decision making, i.e. high (1), low (0) signal logic, the control circuits operate automatically and partially independently of the digital computer. At times during operation of the system, the computer provides inputs to the discrete logic components, working in conjunction therewith to control system components. The discrete logic components send output signals to an isolator board, discussed later, which, in turn, relays these signals to various system components and the computer. The purpose of the discrete logic components is to establish a low voltage hardwire control system that diffuses problems that develop in the system before the system is damaged, even when the user is not present.

Figures 6A, 6B:
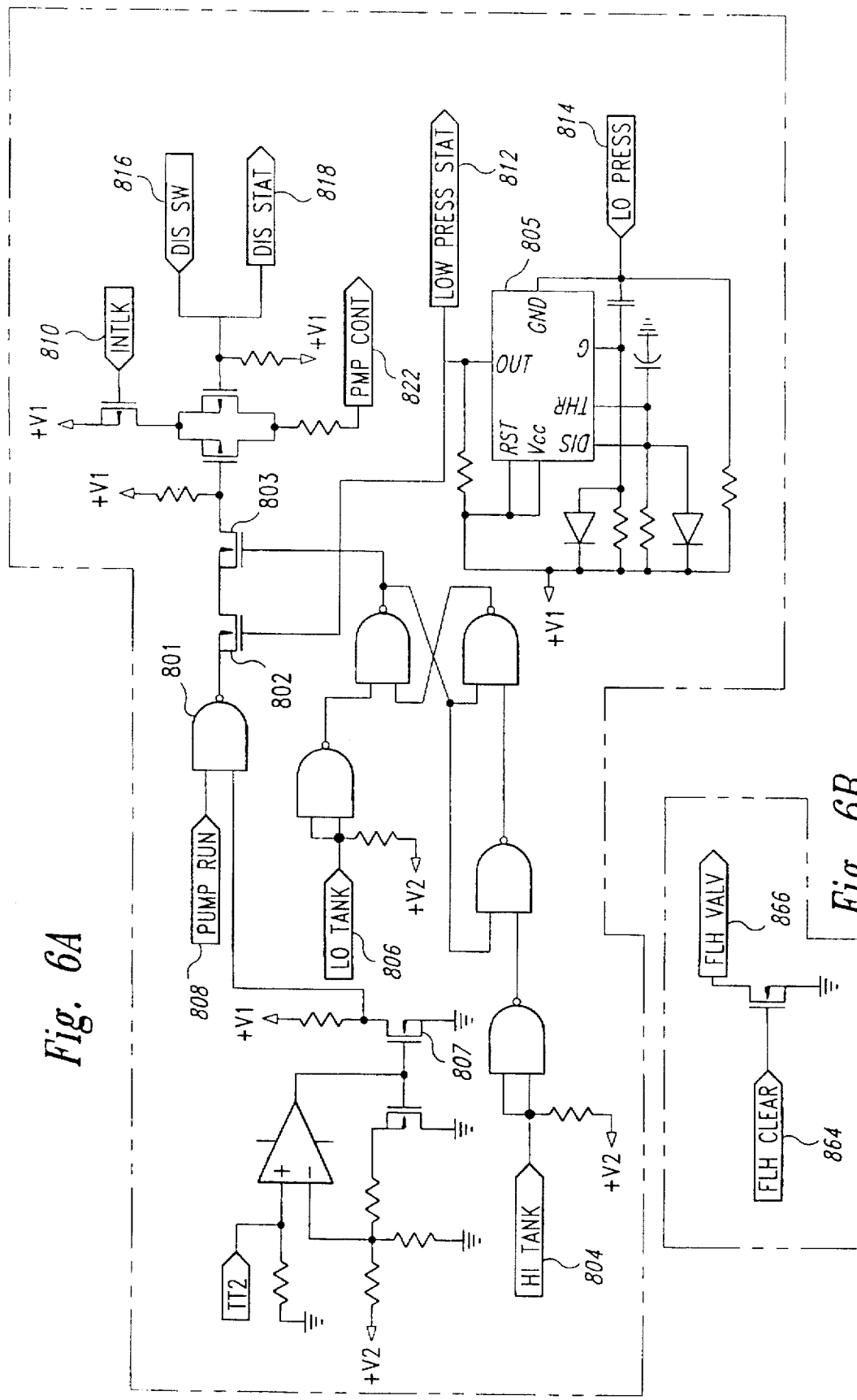
FIGS. 6A-6G are electrical schematic diagrams for the discrete logic control components of the system of FIG. 2.

In FIG. 6A, the discrete logic components for controlling the system pump are illustrated. The computer sends a signal to "PUMP RUN" input 808 to start the pump. Provided that certain sensor inputs receive a high signal and, thus, turn on transistors 802, 803, a signal is sent to "PMPCONT" output 822 to start the pump.

The "PMP CONT" output 822 is first sent to an isolator board, discussed with reference to FIG. 7, which is a switching circuit for ensuring that the computer monitor is on. If the product storage tank transducers LT or HT send a signal to the "LO TANK" or "HI TANK" inputs 806, 804, series transistor 802 becomes inactive, thereby turning off the pump. Similarly, if temperature transducer TT2 senses the fluid is greater than 90 F, input to NAND gate 801 from transducer 807 goes low, causing the pump to turn off.

Since various repairs will be made to the system during its useful life, a control panel is provided adjacent the computer for manually interrupting the system. The control panel includes an interrupt switch which sends a signal to the "INTLK" input 810, thereby turning the pump off.

Figure 6E:
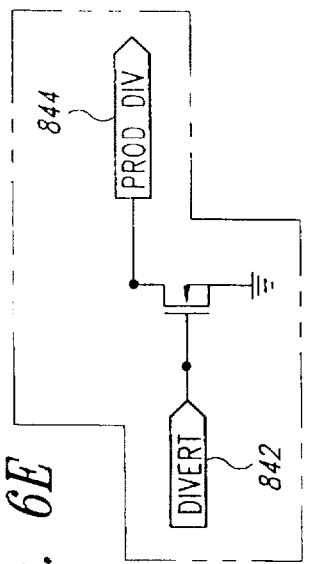
Figure 6F:
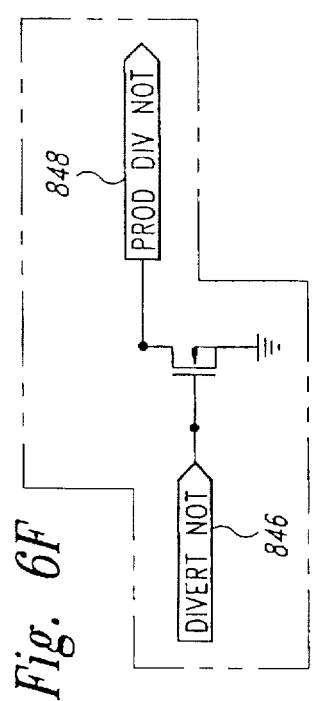
Figure 6G:
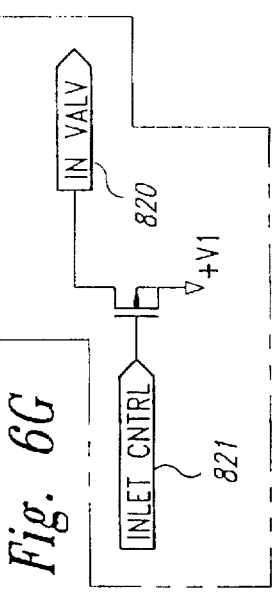

When the disinfect process is desired, a disinfect option is selected through a computer menu option (discussed later), which sends a signal to "PUMP RUN" input 808, to turn off the pump, and as shown in FIG. 6G, sends a signal to "INLET CNTRL" input 821, to close the inlet valve SV1. A subsequent delay allows for manually connecting waste outlet hose 157 (FIG. 1) to inlet port 153a of disinfect tank 156 and discharge hose 185 to inlet port 153b of disinfect tank 156 with valve SV3 in its second position. Then, a control panel key switch is turned on, which turns the pump back on and sends a signal to the computer through "DIS STAT" output 818, to inform the user that the system is in disinfect cycle.

The "LO PRESS" input signal 814 must be low in order for series transistor 802 to become active, allowing the pump to start. A low signal to input 814, received through the isolator board, means the pressure in the system at the pump, as sensed by pressure switch PS1, is greater than 10 psi. 10 psi is a preselected minimum pressure level limit at which the pump can safely operate.

A 555 timer chip 805 acts as a time delay between the "LO PRESS" input 814 and series transistor 802. When the system pressure drops below a preset limit, pressure switch PS1 sends a high signal to the "LO PRESS" input 814, thereby starting the timer chip 805. Only if the high signal continues for approximately fifteen seconds will the timer switch output a high signal to transistor 802. This time delay prevents the pump from turning off during periodic brief pressure fluctuations in the system. While a pressure fluctuation below the preset limit triggers the pressure switch PS1, the minimum pressure level can be set at any level appropriate for safe operation of the pump. "LOW PRESS STAT" output 812 receives a high signal from timer chip 805 during normal operations. However, if the pressure fluctuation exceeds fifteen seconds, the "LOW PRESS STAT" output 812 will become low, which the computer recognizes as a low pressure condition and in response thereto turns off the pump.

In FIG. 6B, the discrete logic components for controlling the flush cycle are illustrated. A "FLH CLEAR" input 864 receives a high signal from the computer when the flush option is selected at the main menu, discussed later. A high signal causes "FLH VALV" output 866 to open valve SV2. Flush cycle is used to wipe the filter membrane clear of particle buildup and is used after disinfect cycle to flush the disinfect solution from the system.

Figure 6C:
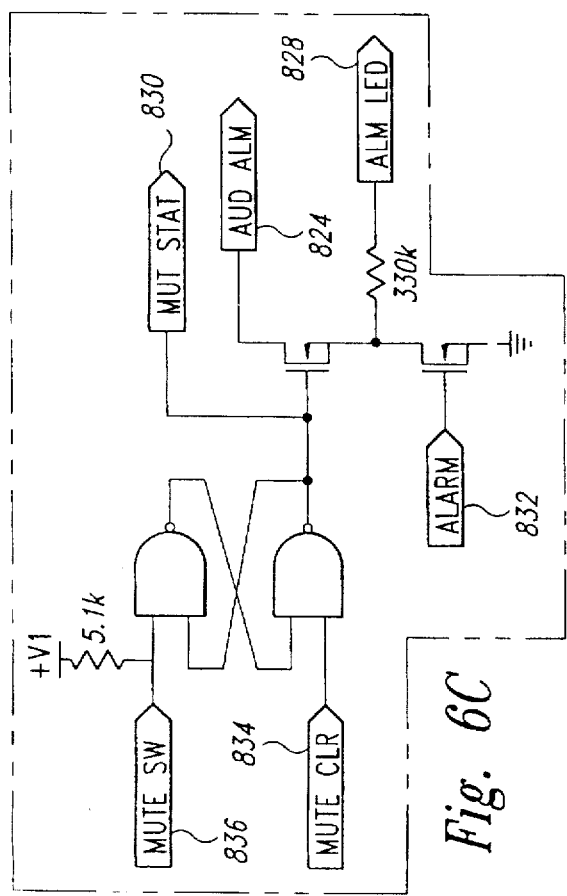

In FIG. 6C, the discrete logic components for controlling an audible alarm 824 and an alarm LED 828 are illustrated. The first input is a mute switch 836, which receives a signal from a mute switch on the control panel. The mute switch is provided should the audible alarm be undesirable. A second input is a mute clear 834, which receives a signal from the computer to turn the alarm back on. The third input is alarm 832. When there is an alarm condition, such as a significant change in fluid temperature, the computer sends a signal to alarm input 832, which activates an LED through an "ALM LED" output 828. A "MUT STAT" output 830 sends a signal to the computer for the user to monitor the status of an "AUD ALM" output 824.

Figure 6D:
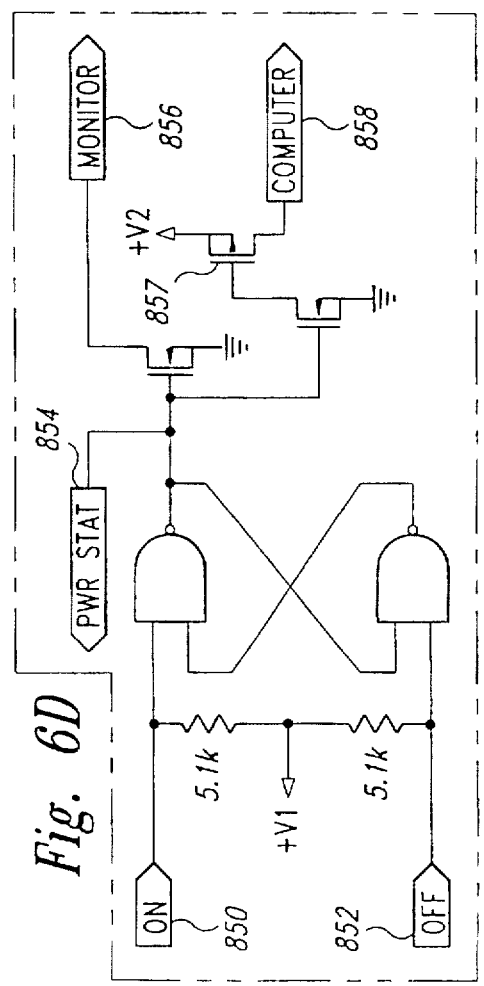
Figure 7:
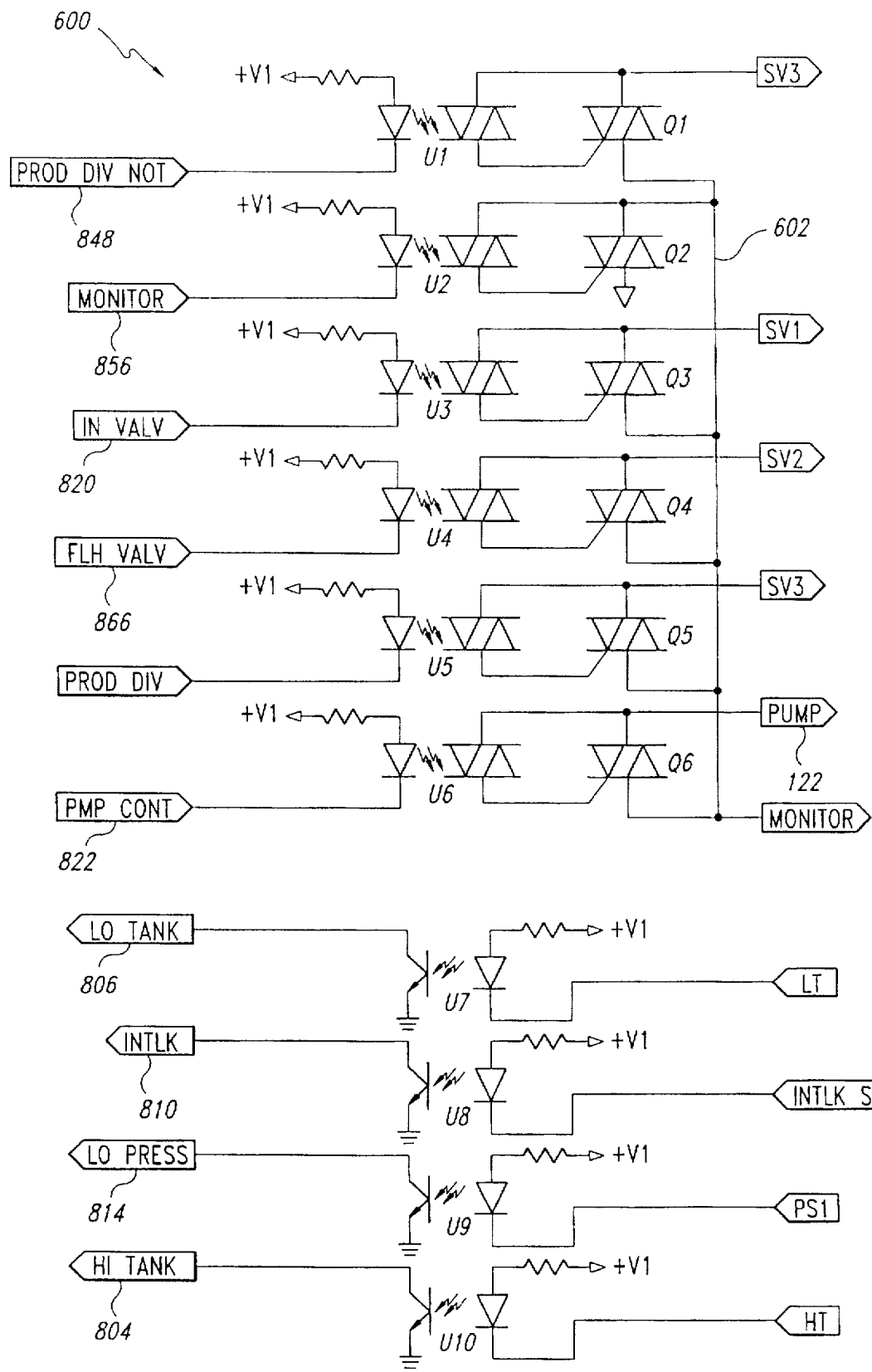
FIG. 7 is an electrical schematic diagram of the isolator board that provides communication between the some of the system components of FIG. 1 and the discrete logic components of FIGS. 6A-6G.

In FIG. 6D, the discrete logic components for controlling the 110 volt power to the isolator board, FIG. 7, are illustrated. The control panel includes a rocker switch that provides a power on signal 850 and a power off signal 852. A "PWR STAT" output 854 sends a signal to the computer indicating the system power is on or off. A "MONITOR" output 856 sends a signal to the isolator board to control the monitor, pump, and valves. A "COMPUTER" output 858 sends a signal to interrupt the hard drive, but not the computer itself, which remains on all the time.

In FIGS. 6E and 6F, the discrete logic components for controlling valve SV3 are illustrated. In FIG. 6E, a "DIVERT" input 842 is received from the computer, which causes a "PROD DIV" output 844 to send a signal to the contacts for valve SV3, to move it to its first position. This diverts product water to the waste conduit. In FIG. 6F, a "DIVERT NOT" input 846 is received from the computer, which causes a "PROD DIV NOT" output 844 to send a signal to the contacts for valve SV3, to move it to its second position. This directs product water to storage tank 164.

Referring now to FIG. 7, an isolation board 600 is illustrated to show the electronic connections between the numerous discrete logic inputs and outputs of FIGS. 6A–6G and their respective system components. The PROD DIV NOT input 848, MONITOR input 856, IN VALV input 820, FLH VALV input 866, PROD DIV input 844, and PMP CONT input 822 are the same output signals provided by the discrete logic outputs. Similarly, the LO TANK output 806, INTLK output 810, LO PRESS output 814, and HI TANK output 804 are the same signals provided to the discrete logic inputs.

Low current optotriac devices U1–U6 take incoming signals from inputs 820, 848, 866, 844, 822, and in response there to, the high current triacs Q1–Q6 turn on, allowing voltage to flow. However, no signals pass to system components SV3, SV1, SV2, PUMP, MONITOR until the MONITOR input 856 is on. Once the "MONITOR" input 856 is on, control line 602 goes high and the signals pass through high current triacs Q1–Q6 to a 110 volt solenoid.

Optoisolators devices U7–U10 take incoming open and close switch signals from system components LT, INILK SW, PT3, HT and pass the signals to the respective outputs 806, 810, 814, 804.

COMPUTER PROGRAM

Figure 8A:
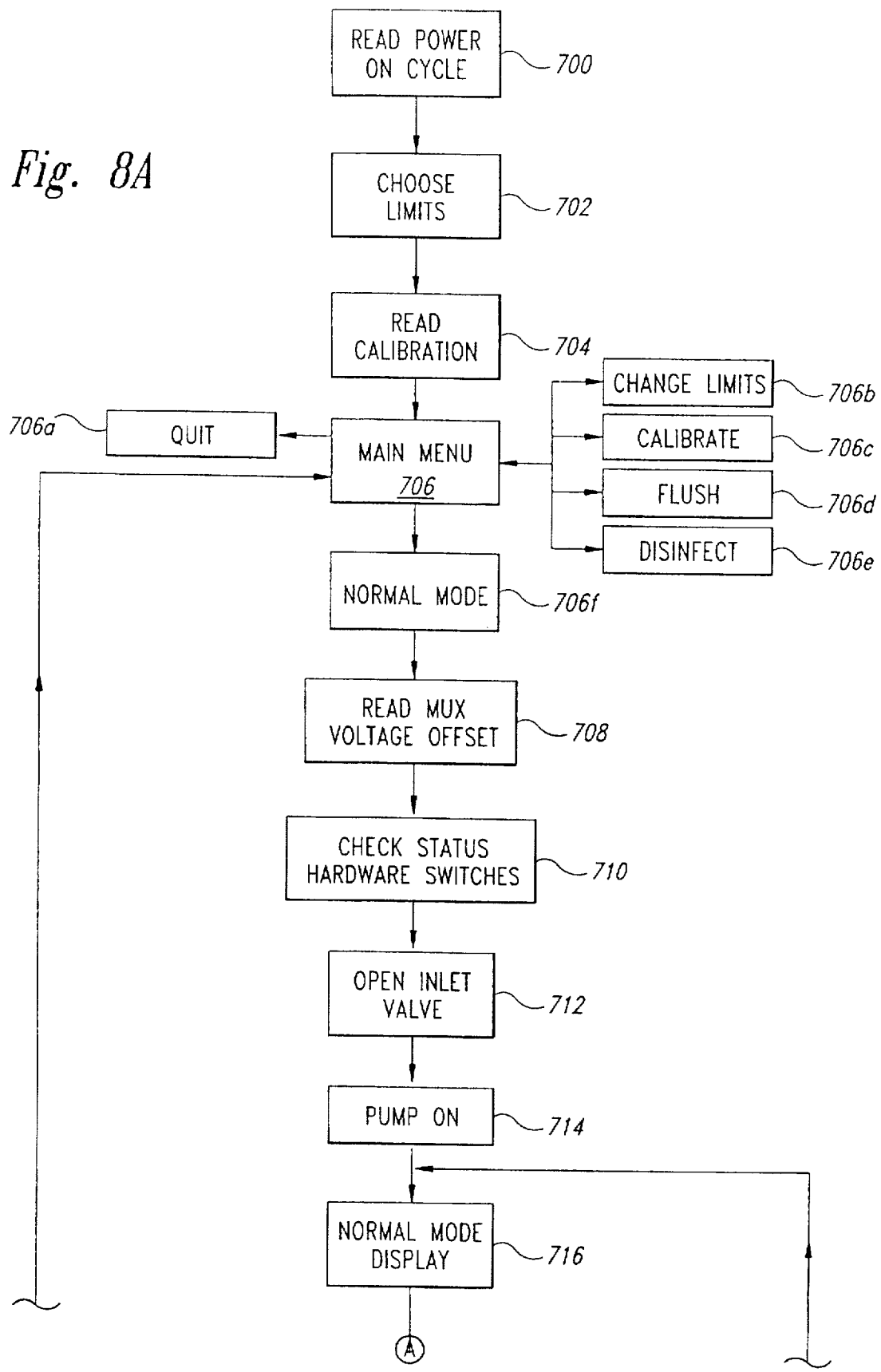
FIGS. 8A-8B are flow charts for the software program in the digital computer of the system of FIG. 2.
Figure 8B:
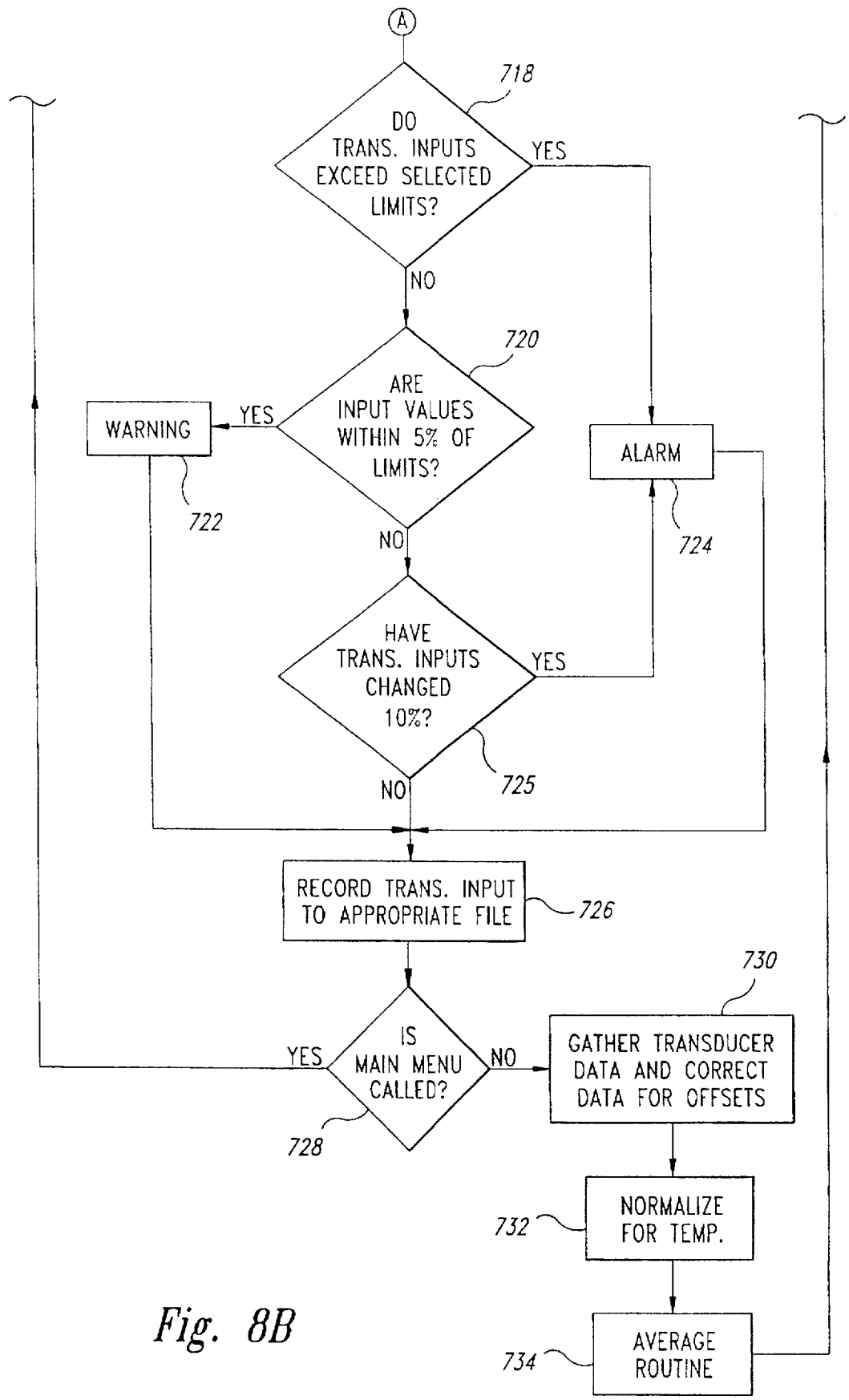

FIGS. 8A and 8B step through various functions of the software program after the transducer signals are conditioned, multiplexed, digitized and sent to the digital computer. Once power to the system is established and the computer is turned on, the program starts by sequentially performing a few initialization steps. First, a runlog subroutine performs a "READ POWER ON CYCLE" 700. The "READ POWER ON CYCLE" 700 makes entries on the hard drive of the current time and date, establishes if the cycle reading is the first of the day, and initiates a timer for the preceding system operation. Second, a "CHOOSE LIMITS" subroutine 702 allows the user to set limits for the monitored input signals. The limits are established by default, such as with manufacturer data, or can be set by the user for all transducers, thereby establishing a means to monitor the system operation parameters. Third, a "READ CALIBRATION" subroutine 704 reads the offset voltage of the transducers and A to D converters from a preestablished file. The offset voltage values are used to help reduce error in the transducer signals sent to the computer.

With the initiation procedures completed, the user is prompted with a "MAIN MENU" display 706 on the monitor. The "MAIN MENU" display 706 provides the user with a list of system options from which to choose. The "QUIT" option 706a shuts off the pump and water supply before exiting the program. The "CHANGE LIMITS" option 706b allows the user to change the minimum and maximum operating limits for each transducer element. If the transducer limit is exceeded during system operation, the program will initiate an alarm condition. (discussed in more detail later). The "CALIBRATE" option 706c gathers and stores the voltage offsets of all transducers, allowing minimum error due to variance in transducer tolerance. The voltage offsets are stored to a related file for future reference. The "FLUSH" option 706d sets a flag and starts the waste flush cycle. The "DISINFECT" option 706e sets a flag and starts the disinfect cycle. Both "FLUSH" and "DISINFECT" options 706d, 706e establish a related file and record the starting time. The flags set for "FLUSH" 706d and "DISINFECT" 706e, prompt a monitor display that the respective cycle has started. Last, the "NORMAL MODE" option 706f starts the system into an operation mode. In system operation mode, the user is provided with a new monitor display, "NORMAL MODE DISPLAY" 716, similar to FIG. 1 without the computer 195, and preforms the following tasks: "READ MUX VOLTAGE OFFSET" values 708, "CHECK STATUS HARDWARE SWITCHES" 710, "OPEN INLET VALVE" SV1 712 and turn "PUMP ON" 714. For safety precautions, the pump turns on a short time after the inlet valve SV1 opens.

At this point, the system starts pumping water through the RO manifold, and the program starts a continuous monitoring loop of the system water by evaluating the various transducer inputs received by the computer. The "NORMAL MODE DISPLAY" 716 shows the user a numeric value of how the conductivity, temperature, flow and pressure are changing in the system. Additionally, the user is provided with a percent rejection display of the conductivity as monitored between the feed inlet water and the product outlet water. If the user desires to perform any of the functions provided by the "MAIN MENU" display 706, a simple key stroke on the keyboard will display the "MAIN MENU" display 706, and the program will wait for a choice to be made. "IS THE MAIN MENU CALLED?" option 728 (FIG. 8B) is prompted by the program at least once every time through the monitoring loop.

The monitoring loop evaluates all system transducer inputs approximately every six seconds, or once through the monitoring loop. During this six second time lapse, each transducer value received by the computer is evaluated by the program to answer three questions: "DOES TRANSducer INPUTs EXCEED SELECTED LIMITS?" 718, "ARE INPUT VALUES WITHIN 5% OF LIMITS?" 720, AND "HAVE TRANSsistor INPUTS CHANGED 10%?" 725. As mentioned earlier, the transducer input limits are established by the user either during initiation steps or from the "CHANGE LIMITS" display 706B option at the main menu. When the answer to the questions of steps 718, 720, 725 is no, the program records each transducer input to the appropriate file, as shown by step 726.

If the transducer input exceeds the selected limits, the program starts an alarm subroutine. The alarm subroutine displays a bar graph representing current transducer inputs and their location relative to the limits, the transducer inputs that exceed their limit are easily recognized by the user for determining the severity of the situation. Transducer limits can be exceeded for numerous reasons, such as an extreme variation in temperature or a rupture in the filter membrane, or a determination from an historical trending subroutine that the filter is nearly clogged with contaminants, or a decrease in the system pressure caused by a faulty pump. If the inputs do not exceed the selected limits, the program must answer the questions: "ARE INPUT VALUES WITHIN 5% OF LIMITS?", as shown by step 720 or "HAVE TRANSducer INPUTS CHANGED 10%", as shown by step 725.

In the most simplistic level of these questions (i.e. the evaluation is only based on one pass of the monitoring loop), the system will either provide a 'WARNING' display 722 on the "NORMAL MODE DISPLAY" 716, or a new 'ALARM' display 724 will appear on the monitor. The 'warning' display 722 provides the word 'warning', colored yellow, in a noticeable corner region of the "NORMAL MODE DISPLAY" 716. The 'ALARM' display 724 clears the "NORMAL MODE DISPLAY" 716, and shows the word 'alarm', colored red, occupying a majority of the screen.

The 'warning' display 722 is provided if the transducer input value is within 5% of the limit for the specific evaluated transducer for any amount of time. On the other hand, the program will provide the 'ALARM' display 722 if the transducer exceeds its preselected limit, or if the transducer input exceeds its preselected limit by more than 10% over a one minute or ten minute duration. After the appropriate alarm is displayed, the program will execute steps 726, 728, 730, 732.

Since the one minute and ten minute alarm conditions must rely on a one minute or ten minute time duration, these specific alarm conditions will be active after an "AVERAGE ROUTINE" 734 is completed at the end of each monitoring loop. The "AVERAGE ROUTINE" 734 calculates the average of the inputs of each transducer element with respect to a one minute, a ten minute, and a one hundred minute time period. For example, the average for a one minute duration is accomplished by adding ten consecutive transducer monitoring loop inputs (each loop takes approximately six seconds) and dividing the sum by 10, to create a one minute average. Likewise, the average for a ten minute duration is accomplished by adding ten consecutive one minute averages and dividing the sum by 10. The average for a one hundred minute duration is accomplished by adding ten consecutive ten minute averages and dividing the sum by 10.

Within the monitoring loop step "HAVE TRANS INPUTS CHANGED 10%" 725, the program will evaluate the one minute and ten minute averages for each transducer calculated by the "AVERAGE ROUTINE" 734, to determine if the "ALARM" display 724 should be active, the one hundred minute average for each transducer is displayed for review by the user to evaluate the performance of the filter over a long period of time. If an alarm condition for the temperature or pressure transducer input remains active for one consecutive monitoring loop cycle, the pump will shut off. The pump is shut off when TT2 sends a signal to the computer or discrete logic establishing that the temperature is to high. As mentioned earlier, this occurs because the temperature exceeds 90° F or pressure in the system, sensed by PS1, drops below a preselected limit for more than approximately 6 seconds.

The monitoring loop step "NORMALIZE FOR TEMP" 732 is a calibration and error reduction step for normalizing the conductivity and flow signals from the product water transducers. While only product water transducer signals are normalized in the preferred mode, other transducer signals could also be normalized if their readings were important to an evaluation of the performance of the system. One important element of calibration includes the calculation of the relative temperature of the filtered fluid within the system.

The product conductivity input is normalized for temperature by the following formula:

$$cpc = npc * 2.332/(0.04941 * tdc\_1.0965)$$

where, corrected product conductivity=cpc uncorrected product conductivity=npc temperature in degrees C=tdc This formula was established by evaluating charts of conductivity versus temperature, as water flow was varied and filter combinations changed, all at a constant pressure. However, this formula alone does not include a correction for the intrinsic value of the conductivity for water. Such a correction is theoretically available for use in ultrapure water above approximately 18 Mg ohm $cm^2$, but is not included in the present invention.

Since the water quality monitor system (WQMS) is based upon the concept that water quality can be deduced from the conductivity of included impurity ions, the system measures both the throughput of the feed water conductivity as well the product water conductivity. The ratio of the two conductivities allows calculation of the percent rejection of the impurities and hence the efficacy of the system.

The efficiency of the system is also a function of flow, and flow can vary as water temperature. In order for the system operator to visually assess the system operation, the water flow is normalized to its equivalent value at 77° F. (25° C.) using the following algorithm, where pt is the product water temperature, pf is the product flow, and pfcorr is the corrected product flow.

```
IF pt > 50 THEN
 IF pt <= 55 THEN
   a = 1.616
   B = .033893
   c = 50
 ELSEIF pt <= 60 THEN
   a = 1.4465
   B = .02539
   c = 55
 ELSEIF pt <= 65 THEN
   a = 1.3196
   B = .0208739
   c = 60
 ELSEIF pt <= 70 THEN
   a = 1.2152
   B = .01877
   c = 65
 ELSEIF pt <= 75 THEN
   a = 1.1213
   B = .01783
   c = 70
 ELSEIF pt <= 80 THEN
   a = 1.0322
   B = .01723
   c = 75
 ELSEIF pt <= 85 THEN
   a = .9452
   B = .01716
   c = 80
 ELSEIF pt <= 90 THEN
   a = .859
   B = .01712
   c = 85
 END IF
```

-continued
```
ELSEIF pt <= 50 THEN
 IF pt >= 45 THEN
   a = 1.8794
   B = .05268
   c = 45
 END IF
END IF
CF = a - (pt - c) * B
IF CF > 3 THEN CF = 1
pfcorr = pf * CF
RETURN
```

The algorithm is applicable for cellulose acetate membranes and could also be experimentally characterized with a least squares fit algorithm. For membranes of different compositions, temperature coefficients a,b,c would change.

While the water purification process can be performed in many ways, we have detailed above the overall architecture of the invention in connection with a reverse osmosis filter. However, the invention is not necessarily dependant on one particular type of filter. On the contrary, the present invention is applicable to any type of molecular screen capable of changing a fluid's content of dissolved solids, colloids, or organic material.

The first step in the purification process entails the filtering of solids from the fluid. A prefilter partially filters the fluid by removing larger solids before the fluid is delivered to the primary membrane screen or filter. As the partially filtered fluid enters the primary filter, smaller dissolved solids are separated by the filter membrane and washed from the filter manifold in the waste water.

The second step is the monitoring of the efficacy and efficiency of the filtering. Various parameters such as, but not limited to conductivity, temperature, pressure and flow are monitored in order to gauge the ability of the filters to remove solids. The monitoring of these parameters provides an indication of when there is contaminant build up along the filter membrane and when the contaminate build up is of such an extent that the filter is no longer able to effectively and efficiently purify the water.

The third step is the collection of data from the transducer elements that monitor the various parameters. The collected data is normalized relative to other data. Specifically, conductivity and flow are normalized relative to temperature.

The normalized data is used to create process variables. The process variables are used to normalize the efficacy and efficiency values of the filter. The variables are monitored and trended for process deviations that can provide an early indication of system degradation. A data bank of process variable information is created for evaluating future filter performance.

The fourth step is the displaying of filter performance information, the purity of the filtered water, historical trends, and process alarms. The display of this real time and historical data allows an operator to make maintenance and purification decisions more effectively.

The fifth step is the performing of various control tasks. Control can be performed automatically with the discrete logic components or digital computer, or manually by the user. The process has automatic controls to interlock certain mechanical components so that damage does not inadvertently occur to the system. Other functions can be initiated by the human operator for maintenance or product quality priorities.

All of the foregoing steps of the purification process ensure that the water is filtered as effectively and efficiently as possible. The following is a general parts list for FIGS. 3—7.

| Ref. # | Part Value |
|---|---|
| FIG. 3 | |
| *resistors (Ω)* | |
| 312, 314 | 23.7k |
| 336, 369 | 15.0k |
| 338 | 100k |
| 339 | 3.0k |
| 356 | 3.24k |
| 342 | ~10.0k |
| 357 | 820k |
| 368, 376 | 10.0k |
| 377 | 2.67k |
| *capacitors (μf)* | |
| 324 | 0.01 |
| 358, 367 | 1.0 |
| 372, 374 | 0.22 |
| *diodes* | |
| 337 | red led |
| 364, 366 | 1N4149 |
| *op-amps* | |
| 322, 354 | TL084 |
| 357, 362 | TL084 |
| 375 | TL084 |
| FIG. 4 | |
| *transistors* | |
| 332 | 2N5088 |
| 334 | 2N5087 |
| *resistors (Ω)* | |
| 410 | 100 |
| 416 | 15k |
| 418, 430 | 100k |
| 424 -set to offset V =0 | |
| 426 | 51 |
| 425 -precision resister | |
| 432, 442 | 10k |
| 436, 450 | 7.5k |
| 438, 444 | 432k |
| 452, 458 | 475k |
| 462 | 845 |
| *capacitors(μf)* | |
| 404, 406 | 1.0 |
| 412 | 0.1 |
| 414 | 0.0001 |
| 440, 446 | 0.22 |
| 454, 460 | 0.22 |
| *ic's* | |
| 402 | 78L05 |
| 422, 434 | TL084 |
| 448, 464 | TL084 |
| FIG. 5 | |
| *resistors (Ω)* | |
| 508 | 4.7k |
| 512 | 4.7M |
| 522 | 10k pot |
| 524 | 95.3k528, |
| 532 1.0M | |
| 538, 552 | 10.0k |
| 540 | 845k |
| 542, 546 | 909k |
| 554 | 7.5k |
| FIG. 4 | |
| *capacitors (μf)* | |
| 526 | 0.01 |
| 530, 534 | 0.22 |
| 544, 548 | 0.22 |
| *ic's* | |
| 504, 536 | TL084 |
| 550 | TL084 |

-continued

| Ref. # | Part Value |
|---|---|
| FIG. 5 | |
| *ic's (cont.)* | |
| 510, 514 | 74C00 |
| 516, 518 | 74C00 |
| 502, 503, 505 -proteus flow transducer | |
| 520 | TLC555 |
| FIG. 6 | |
| *ic's* | |
| NAND gates -74LS00 | |
| Transistors -zvn3306 | |
| 857 | IRF9z10 |
| FIG. 7 | |
| *resistors* | |
| all | 220Ω |
| *ic's* | |
| optoiso's - MOC3021 | |
| Triaces | L4004F31 |

A computer program, containing a control process similar to that shown in FIGS. 8A, 8B, is included in Appendix A, attached hereto.

It is to be understood that many variations in size, shape, and construction can be made to the illustrated and above-described embodiment without departing from the spirit and scope of the present invention. Some of the features of the preferred embodiment may be utilized without other features. Therefore, it is to be understood that the presently described and illustrated embodiment is nonlimitive and is for illustration only. Instead, my patent is to be limited for this invention only by the following claim or claims interpreted according to accepted doctrine of claim interpretation, including the doctrine of equivalents and reversal of parts.

What is claimed is:

1. A liquid treatment system, comprising:

a liquid treatment station at which a liquid is treated to control at least one condition of said liquid;

a liquid input conduit for delivering liquid to be treated to the liquid treatment station;

a treated liquid conduit for removing treated liquid from said liquid treatment station;

at least one transducer in said input conduit for producing an analog electric signal that is indicative of a condition to be controlled, as found in the liquid to be treated;

at least one transducer in said output conduit for producing an analog electrical signal that is indicative of the same condition, but as found in the treated liquid;

signal collection and conditioning circuitry, connected to said transducers, for conditioning the analog electrical signals received from said transducers to produce analog control signals;

a multiplexer connected to receive the analog control signals from said signal collection and conditioning circuitry;

an analog-to-digital converter connected to receive conditioned analog control signals from said multiplexer; and a digital computer connected to receive digital control signals from said analog to digital convertor, and adapted to use said digital control signals to create norm value data indicative of norm values for each

23 condition to be controlled. to store said norm value data. and to compare real-time digital control signals to the stored norm value data in order to determine the effectiveness of the treatment given to the liquid at the treatment station.

2. The system of claim 1. wherein the treatment comprises filtering the liquid and the liquid treatment station includes a filter through which liquid passes.

3. The system of claim 2. wherein said system includes transducers in the input and treated liquid conduits for producing analog electrical signals that are indicative of at least two of the following conditions: conductivity. temperature. pressure and flow.

4. The system of claim 3. wherein the transducers in the input and treated liquid conduits include a transducer in each said conduit for producing an analog electrical control signal that is indicative of the temperature of the liquid in that conduit. and at least one additional transducer in each said conduit for producing at least one analog electrical signal that is indicative of at least one condition selected from the group consisting of conductivity. pressure and flow.

5. The system of claim 4. wherein said system includes circuitry that utilizes the signal indicative of temperature and the at least one signal indicative of the at least one additional condition for normalizing said at least one additional condition with respect to a predetermined temperature value.

6. The system of claim 1. including a pump in the liquid input conduit for raising the pressure of the liquid to be treated.

7. The system of claim 6. wherein the treatment comprises filtering the liquid and the liquid treatment station includes a filter.

8. The system of claim 7. wherein said system includes transducers in the input and treated liquid conduits for producing analog electrical control signals that are indicative of at least two of the following conditions: conductivity. temperature. pressure and flow.

9. The system of claim 8. wherein the transducers in the input and treated liquid conduits include a transducer in each said conduit for producing an analog electrical signal that is indicative of the temperature of the liquid in that conduit. and at least one additional transducer in each said conduit for producing at least one analog electrical signal that is indicative of at least one additional condition selected from the group consisting of conductivity. pressure and flow.

10. The system of claim 9. wherein said system includes circuitry that utilizes the signal indicative of temperature and the at least one signal indicative of the at least one additional condition for normalizing said at least one additional condition with respect to a predetermined temperature value.

11. The system of claim 6. further including discreet logic circuitry connected to receive the analog control signals from the signal collection and conditioning circuitry and adapted to shut down the pump in response to control signals showing that some part of the system is operating outside of a system norm.

12. The system of claim 11. wherein the discreet logic circuitry is adapted to shut down the pump in response to a control signal indicating that the temperature in the input circuit is excessively high.

13. A method of treating a liquid and monitoring the treatment. comprising:
providing a liquid treatment station;
delivering liquid to be treated to the liquid treatment station;
treating the liquid at the liquid treatment station to control at least one condition of said liquid;

24 removing treated liquid from the liquid treatment station;
providing at least one transducer in the liquid being delivered to the liquid treatment station;
providing at least one transducer in the treated liquid;
using said transducers to measure values of the at least one condition of the liquid. before and after treatment and produce electrical signals indicative of the at least one condition;
producing electrical control signals from the electrical signals produced by the transducers for each condition;
utilizing a computer and the electrical control signals to determine an operating norm for each condition in the system and further to determine in real time if any of the following conditions exist:

a) the value in real time exceeds the operating norm;

b) the value in real time does not exceed the operating norm but is within a predetermined percentage of the operating norm; and c) the value in real time does not exceed the operating norm and is not within said predetermined percentage of the operating norm but has changed the predetermined percentage over a predetermined amount of time; and using said computer to collect and store information respecting determinations (a). (b) and (c).

14. The method of claim 13. wherein the step of using the computer to determine if any of the conditions (a). (b) and (c) exist includes:

i) determining if the real time value is within a predetermined percentage of the operating norm if the actual condition does not exceed the operating norm; and ii) determining if the real time value has changed a predetermined percentage over a predetermined amount of time if the actual condition does not exceed the operating norm and is not within said predetermined percentage of the operating norm.

15. A purification system for monitoring the filtration of an aqueous fluid. the system comprising:

(a) a filter element for filtering the aqueous fluid. (b) a plurality of transducer elements for producing electrical signals that are representative of characteristics of the aqueous fluid. wherein a pair of the transducer elements produces a signal representative of conductivity;

(c) electronic circuitry for conditioning some of the transducer element signals including a conductivity transducer element signal;

(d) electronic circuitry for normalizing one of the conditioned signals relative to another signal;

wherein the electronic circuitry for conditioning the conductivity transducer element signal collects signals from the conductivity transducer element by exciting the element with an AC triangular electrical waveform of a predetermined frequency and amplitude;

wherein the electronic circuitry for conditioning the conductivity transducer element signal includes:

a) a feed terminal. a product terminal. a feed signal output terminal. and a product signal output terminal. the pair of transducer elements that produce signals representative of conductivity being connected to the feed terminal. and to the product terminal respectively;

b) a pair of current sources that produce temperature compensated AC constant currents each including input and output terminals, wherein the first source output terminal is connected to the feed terminal and the second source output terminal is connected to the product terminal;

c) a periodic signal generator for producing an AC triangular electrical wave form including an output terminal, which is connected to the terminals of the current sources;

d) at least a pair of precision resistors, a first resistor being connected in parallel with the element connected to the feed terminal, and a second resistor being connected in parallel with the element connected to the product terminal;

e) at least a pair of unity gain amplifiers each including input and output terminals, the first amplifier input terminal being connected to the feed terminal, and the second amplifier input terminal being connected to the product terminal;

f) at least a pair of rectifiers each including input and output terminals, the first rectifier input terminal being connected to the output terminal of the first amplifier, and the second rectifier input terminal being connected to the output terminal of the second amplifier;

g) at least a pair of low pass filters each including input and output terminals, wherein the first filter input terminal is connected to the output terminal of the first rectifier and the second filter input terminal is connected to the output terminal of the second rectifier; and h) at least a pair of conductivity signal output terminals, the first output terminal connected to the output terminal of the first low pass filter, and the second output terminal connected to the output terminal of the second low pass filter.

16. A purification system for monitoring the filtration of an aqueous fluid, the system comprising:

a) a filter element for filtering the aqueous fluid, b) a plurality of transducer elements for producing electrical signals that are representative of characteristics of the aqueous fluid, wherein one of the transducer elements produces a signal representative of flow;

c) electronic circuitry for conditioning at least the flow representative transducer element signal;

d) electronic circuitry for normalizing the flow representative conditioned signal relative to another signal;

wherein the flow signal producing transducer element includes a periodic wave voltage source and the electronic circuitry for conditioning the flow transducer signal includes:

a) a leading edge detector circuit connected to the periodic wave voltage source for determining the time delay between the leading edges of each wave of the periodic wave voltage, b) a pulse train circuit connected to the leading edge detector circuit for producing a voltage that varies relative to the frequency of the time delay determined by the leading edge detector circuit, and c) a low pass filter circuit connected to the pulse train circuit for converting the varying voltage into a DC signal.

17. The purification system of claim 16, wherein the flow signal producing transducer element further comprises:

a) a rotatable element for placement within the aqueous fluid having a center axis;

b) a magnet positioned outwardly from the center axis on the rotatable element;

c) an inductive element, positioned adjacent the rotatable element, for producing a pulsating voltage signal in response to the magnet; and d) a transistor between the inductive element and the leading edge detector circuit, for transforming a pulsating voltage to the periodic wave voltage.

18. The purification system of claim 17, wherein the flow signal producing transducer element further comprises an amplifier positioned between the inductive element and the transistor.

19. An aqueous fluid purification process comprising the steps of:

a) passing aqueous fluid through a filter element;

b) sensing characteristics of the aqueous fluid with a plurality of transducer elements, each transducer element adapted to produce an electrical signal representative of a characteristic of the aqueous fluid;

c) conditioning the electrical signals from the plurality of transducer elements;

d) normalizing one of the conditioned signals relative to another signal;

e) comparing the normalized signal to a preset limit for that signal to determine if the normalized signal is within an acceptable range, and providing a real time alarm to indicate when the normalized signal has moved outside a preset limit; and wherein one of the characteristics sensed by the transducer elements is conductivity, and the signal from the transducer element that produces a conductivity representative signal is collected by exciting the element with an AC triangular electrical waveform of a predetermined frequency and amplitude.

20. A method of monitoring an aqueous fluid in a filtration system, comprising:

a) passing aqueous fluid through a filter;

b) providing transducers that can measure a characteristic of the aqueous fluid upstream and downstream of the filter and convert it to electric signals indicative of said characteristic;

c) utilizing the transducers circuitry and a computer to measure the characteristic of the aqueous fluid over a period of time, create operating norm value date for the characteristic and store said date in the computer;

d) using the transducers to measure the value of the characteristic of the aqueous fluid in real time and produce an electric signal indicative of said value;

e) utilizing the computer and the electrical signal to determine if any of each of the following conditions exist:

(i) the real time value exceeds the operating norm;

(ii) the real time value does not exceed the operating norm but is within a predetermined percentage of the operating norm; and (iii) the real time value does not exceed the operating norm and is not within said predetermined percentage of the operating norm but has changed a predetermined percentage over a predetermined amount of time; and f) using said computer to collect and store information respecting determinations (i), (ii) and (iii).

21. The method of claim 20, wherein the transducers include transducers to measure conductivity and temperature; and further comprising normalizing at least said electrical signal from conductivity transducer for temperature by the following formula:

$$Cpc = npc * (K/tdc)$$

where, corrected product conductivity=cpc uncorrected product conductivity=npc temperature=tdc and K is a constant, in a calibration and error reduction step.

22. The method of claim 21, wherein the formula resolves to:

$$cpc = npc * 2.332/(0.04941*tdc\_1.0965)$$

when normalized to 25° C.

23. The method of claim 20, wherein the step of using the computer to determine if any of the conditions (i), (ii) and (iii) exist includes:

a) determining if the real time value is within a predetermined percentage of the operating norm if the actual condition does not exceed the operating norm; and b) determining if the real time value has changed a predetermined percentage over a predetermined amount of time if the actual condition does not exceed the operating norm and is not within said predetermined percentage of the operating norm.

* * * * *